(12) United States Patent
Dey et al.

(10) Patent No.: US 7,743,161 B2
(45) Date of Patent: Jun. 22, 2010

(54) DIGITAL CONTENT BUFFER FOR ADAPTIVE STREAMING

(75) Inventors: Sujit Dey, San Diego, CA (US); Douglas Wong, San Diego, CA (US); Jiangtao Wen, La Jolla, CA (US); Yusuke Takebuchi, San Diego, CA (US); Parag Arole, Carlsbad, CA (US); Debashi Panigrahi, San Diego, CA (US)

(73) Assignee: Ortiva Wireless, Inc., La Jolla, CA (US)

( * ) Notice: Subject to any disclaimer, the term of this patent is extended or adjusted under 35 U.S.C. 154(b) by 636 days.

(21) Appl. No.: 11/548,273

(22) Filed: Oct. 10, 2006

(65) Prior Publication Data

US 2008/0086570 A1    Apr. 10, 2008

(51) Int. Cl.
*G06F 15/16*   (2006.01)
(52) U.S. Cl. .................................. 709/231; 709/232
(58) Field of Classification Search .................. 709/231
See application file for complete search history.

(56) References Cited

U.S. PATENT DOCUMENTS

| | | | |
|---|---|---|---|
| 4,814,883 A * | 3/1989 | Perine et al. .................. 725/36 |
| 5,764,298 A * | 6/1998 | Morrison ..................... 348/500 |
| 6,014,694 A | 1/2000 | Aharoni et al. |
| 6,177,931 B1 * | 1/2001 | Alexander et al. ............. 725/52 |
| 6,378,035 B1 * | 4/2002 | Parry et al. .................. 711/110 |
| 6,456,591 B1 | 9/2002 | Mishra |
| 6,529,552 B1 | 3/2003 | Tsai et al. |
| 6,724,977 B1 * | 4/2004 | Linzer .......................... 386/52 |
| 6,757,796 B1 | 6/2004 | Hofmann |
| 6,766,376 B2 | 7/2004 | Price |
| 7,023,488 B2 * | 4/2006 | Szybiak et al. .............. 348/484 |
| 7,054,911 B1 | 5/2006 | Lango et al. |
| 2002/0073228 A1 * | 6/2002 | Cognet et al. ............... 709/236 |
| 2002/0107027 A1 * | 8/2002 | O'Neil ........................ 455/456 |
| 2002/0116715 A1 | 8/2002 | Apostolopoulos |
| 2002/0131496 A1 * | 9/2002 | Vasudevan et al. ..... 375/240.11 |
| 2002/0136298 A1 * | 9/2002 | Anantharamu et al. . 375/240.12 |

(Continued)

FOREIGN PATENT DOCUMENTS

WO    WO03/065683 A1    8/2003

(Continued)

OTHER PUBLICATIONS

Hong, James W., "A Generic Paradigm for Efficient Distributed Communication", Jul. 1991, University of Waterloo, pp. 1-19.*

(Continued)

*Primary Examiner*—Jeffrey Pwu
*Assistant Examiner*—Youpaporn Nilanont
(74) *Attorney, Agent, or Firm*—Townsend and Townsend and Crew LLP

(57) ABSTRACT

Network transmission of live digital content from sources to receiving devices is enabled with real-time encoding, customization, and transmission of the live content according to user preferences, receiving device characteristics, network conditions and the like. Content, such as advertising customized to user profile and user location, may be conveniently inserted into the live content. Source-to-screen delay from sources to receiving devices is reduced and channel switching is supported.

79 Claims, 14 Drawing Sheets

U.S. PATENT DOCUMENTS

| | | | |
|---|---|---|---|
| 2003/0125932 A1* | 7/2003 | Wang et al. | 704/201 |
| 2003/0142670 A1* | 7/2003 | Gould et al. | 370/390 |
| 2004/0045030 A1 | 3/2004 | Reynolds et al. | |
| 2004/0064573 A1 | 4/2004 | Leaning | |
| 2004/0117427 A1 | 6/2004 | Allen et al. | |
| 2004/0215802 A1 | 10/2004 | Amini et al. | |
| 2005/0076099 A1 | 4/2005 | Wang et al. | |
| 2005/0089092 A1 | 4/2005 | Hashimoto et al. | |
| 2005/0123058 A1* | 6/2005 | Greenbaum et al. | 375/240.28 |
| 2005/0135476 A1 | 6/2005 | Gentric et al. | |
| 2005/0169312 A1 | 8/2005 | Cakareski et al. | |
| 2005/0172028 A1* | 8/2005 | Nilsson et al. | 709/231 |
| 2005/0286149 A1 | 12/2005 | Haswell | |
| 2006/0136597 A1 | 6/2006 | Shabtai et al. | |
| 2006/0218169 A1 | 9/2006 | Steinberg et al. | |
| 2006/0280252 A1 | 12/2006 | Kwon et al. | |

FOREIGN PATENT DOCUMENTS

| | | |
|---|---|---|
| WO | WO03/084172 A | 10/2003 |
| WO | WO2006/029068 A2 | 3/2006 |
| WO | WO2006/055768 A2 | 5/2006 |
| WO | WO2006/055769 A2 | 5/2006 |

OTHER PUBLICATIONS

Moshnyaga, Vasily G., "An Implementation of Data Reusable MPEG Video Coding Scheme", 2005, World Academy of Science, pp. 1-4.*

Dalziel, Stuart, "Record Linear Time Code Data" [Online], Feb. 1996 [Retrieved Jun. 2009], <http://www.damtp.cam.ac.uk/lab/digimage/hlpfiles/vs@2.htm>, pp. 1-2.*

Chen, Songqing, et al. "Segment-Based Proxy Caching for Internet Streaming Media Delivery", *IEEE MultiMedia*, Jul.-Sep. 2005, pp. 59-67.

Cranor, Charles D., et al. "Enhanced Streaming Services in a Content Distribution Network", *IEEE Internet Computing*, Jul.-Aug. 2001, pp. 66-75.

Guo, Lei, et al. "DISC: Dynamic Interleaved Segment Caching for Interactive Streaming", *Proceedings of the 25th IEEE International Conference on Distributed Computing Systems* (ICSCS'05) (2005) pp. 1-10.

Taylor, Clark N., et al. "V-SHAPER: An Efficient Method of Serving Video Streams Customized for Diverse Wireless Communication Conditions", *IEEE Communications Society, Proceedings of Globecomm 2004* (Nov. 29-Dec. 3, 2004), pp. 4066-4070.

Amini, L., et al. "ARMS: Adaptive Rich Media Secure Streaming", *Proceedings of the ACM International Multimedia Conference and Exhibition; 2003 Multimedia Conference—Proceedings of the 11th ACM International Conference on Multimedia* (2003) pp. 86-87.

Ozcelebi, T., et al. "Minimum Delay Content Adaptive Video Streaming over Variable Bitrate Channels with a Novel Stream Switching Solution", *IEEE International Conference* on Genova, Italy, Sep. 11-14, 2005, vol. 1:209-212.

Taylor, Clark N., et al. "Run-time Allocation of Buffer Resources for Maximizing Video Clip Quality in a Wireless Last-Hop System", (Communications, 2004 IEEE International Conference on Paris, France Jun. 20-24, 2004), *IEEE* (2004) 5:3081-3085.

Turaga, D.S., et al. "Adaptive Live Streaming Over Enterprise Networks", Multimedia and Expo, 2005, ICME 2005. *IEEE International Conference* on Amsterdam, The Netherlands, Jul. 6, 2005, p. 974-979.

International Search Report dated Aug. 20, 2008 for PCT/US2007/076906, 3 pages.

International Search Report dated Aug. 18, 2008 for PCT/US2007/076905, 3 pages.

International Search Report dated Apr. 18, 2008 for PCT/US2007/080989, 2 pages.

* cited by examiner

US 7,743,161 B2

DIGITAL CONTENT BUFFER FOR ADAPTIVE STREAMING

CROSS-REFERENCE TO RELATED APPLICATIONS

This application is related to co-pending patent applications U.S. application Ser. No. 11/467,897 entitled "Network Adaptation of Digital Content" to Debashis Panigrahi et al. filed Aug. 28, 2006 and U.S. application Ser. No. 11/467,890 entitled "Digital Video Content Customization" to Sujit Dey et al. filed Aug. 28, 2006. The contents of these related applications is incorporated herein by reference in their entirety for all purposes.

BACKGROUND

Multimedia content for viewing at computer devices permits users to view digital content comprising audio, video, graphics, and multi-channel data. A wide variety of computer devices can be used to access such multimedia content over a wide variety of networks and connection schemes. Different types of network access technologies provide a wide range of network availability. For example, while network bandwidth available in a GPRS network ranges from 9.6 kbs to 144 kbps, the bandwidth available for 1xEV-DO is in the range of 1 Mbps. Additionally, the network condition can change dynamically for some of the network access technologies, such as wireless networks including WLAN, WiMaX, GPRS, EDGE, and the like. Thus, the available bandwidth for a given network access technology can vary over the duration of a communication session with a receiving device. Similarly, different receiving devices have different resource availability characteristics that can impact the delivery of digital content to all devices. Thus, different users can have very different multimedia viewing experiences.

Streaming of multimedia content involves transfer of data from a content source to a receiving device for real-time display and rendering of the content. Typically, a cache or buffer data store is maintained at the receiving device having a relatively small data capacity that is sufficient for transitory storage of multimedia content. The cache store is sufficient so the user does not perceive data arriving piecemeal, but rather observes an uninterrupted stream of content that is generally referred to as a multimedia clip. A multimedia clip in its entirety can contain sufficient content to create a run time of seconds, minutes, or even hours, though typically the receiving device cache contains no more than a few seconds worth of content at a time. The streaming environment is essentially equivalent to a television broadcast in terms of the need to maintain a steady communications connection for the duration of the clip with no drops of information from beginning to end. The time varying and bandwidth limited nature of network conditions can create dynamic challenges for delivery of multimedia content in the quest to deliver the content such that the overall perceptual quality of the content for the desired group of users is sufficiently high. The streaming delivery of the content can be characterized by the quality of experience (either for individual users such as typical in the case of video-on-demand or for an aggregated group of users such as in the case of broadcasting of content).

One type of streaming delivery that presents challenges is streaming of live content. A typical application of streaming of live content is providing a broadcast feed, such as a live television broadcast, in near-simultaneous re-broadcast over a network computer connection. A stream of live content provider receives the live feed, which may comprise a television signal such as NTSC, PAL, or SECAM, and encodes the live feed for delivery over a computer network such as the Internet. The digital content of a stream of live content is typically unknown prior to receiving the signal. Hence, the video quality of the live feed signal, the resource requirements for processing the live feed, optimal encoding strategies for the content, and the like cannot be determined in advance. The situation becomes even more complex if the user (the person viewing the stream of live content at the receiving device) is permitted to change viewing channels or if the live feed content requires content insertion during encoding. In such circumstances, it is important for the communication session to continue without interruption and for the viewing experience to maintain a high quality.

Wireless network connections can be especially challenging for streaming delivery of multimedia content. Current real-time (streaming) delivery services on the Internet (e.g., Real Networks, Windows Media) have made some attempts at reducing the bandwidth required for delivering video and multimedia content, and adjusting the delivery of content according to the available bandwidth of wireless networks. Streaming delivery, however, would be improved if the streaming delivery could account for the nature of the content being streamed and for dynamic changes in network conditions on a user-by-user basis in response to real-time changes in network conditions.

Dynamic online adaptation of the content usually involves examining the content over a temporal duration and making decisions with respect to the encoding and streaming parameters associated with the bitstream for the temporal duration of the content stream transmitted over the network. This often means that the multimedia streamer will need to repeatedly buffer compressed multimedia content of a sufficient length for the temporal duration. For typical video-on-demand applications for which the content has been entirely pre-encoded (albeit with possibly multiple versions suitable for different network conditions), this issue of buffering the content is straightforward. For example, multiple versions of the multimedia clip can be prepared for a combination of network conditions, and an appropriate version can be selected for streaming at intervals corresponding to the temporal duration supported by the content source server. The buffer length or duration of streaming intervals may be equal in length to the clip itself or may be for a portion of the entire clip.

In the case of streaming of live content or broadcast or multicast of multimedia content for which the temporal duration is unknown to the encoder/streamer (i.e. the duration of the clip is infinite as far as the encoder and streamer are concerned), methods and apparatus are needed to provide sufficient content buffering on a continued basis, thereby allowing dynamic and online content adaptation, while at the same, providing multiple users with access to the same live broadcast or multicast content.

SUMMARY

In accordance with the present invention, digital content for streaming of live content by network transport is processed such that a digital content clip is encoded according to epochs. Each epoch comprises a different portion in a consecutive collection of independently encoded intervals. The encoding generates prepped content that comprises at least one encoded representations of each epoch, such that each epoch comprises a different consecutive portion or interval of the digital content clip. The prepped content for a predetermined number of epoch intervals is stored into a streaming buffer of a network data store, and one of the prepped content epoch intervals is selected for reading from the streaming buffer. An encoded representation of the selected epoch interval is streamed from the buffer in accordance with current network condition between the network data store and the receiving device. The selected prepped content epoch interval is streamed by network transport that is directed to the receiving device. In this way, network transmission of live digital content from sources to receiving devices is enabled with real-time encoding, customization, and transmission of the live content according to user preferences, receiving device characteristics, network conditions and the like. Content, such as advertising that is customized to user profile and user location, may be conveniently inserted into the live content. Source-to-screen delay from sources to receiving devices is reduced and channel switching is supported.

A system constructed in accordance with the invention enables streaming of live multimedia content for reception by mobile receiving devices such that the stream is adapted for current network conditions to each of the receiving devices. Streaming in accordance with the present invention dynamically adapts the content bitstream in response to channel conditions as estimated, based on receiving device feedback. A set of alternative representations of the content are selected for the best trade-off between quality, bandwidth, and error resiliency. A window of consecutive segments of the content clip are examined and encoded, typically using predictive coding compression. The consecutive segments are referred to as epoch intervals. The epoch intervals can have the same predetermined temporal duration. The epoch structure inherently synchronizes all the client sessions to within the duration of an epoch. In this way, streaming is performed with dynamic and online content adaptation for multiple users with access to the same live broadcast or multicast content.

In adapting the content to the network conditions based on network condition information, the streamer may operate on portions of bitstreams across epoch boundaries so as to achieve more flexibility and finer granularity.

In accordance with the invention, digital content is processed for streaming of live content network transport by encoding a digital content clip according to epoch intervals comprising one or more consecutive predetermined portions of the digital content clip, wherein the encoding generates prepped content that comprises multiple encoded representations of each epoch interval, such that each epoch interval comprises a different consecutive portion of the digital content clip and each of the multiple encoded representations comprises a different encoded representation of the corresponding digital content clip epoch interval. The prepped content for a predetermined number of epoch intervals is stored into a streaming buffer of a network data store. From the streaming buffer, one of the prepped content epoch intervals is selected for reading from the streaming buffer in accordance with current network condition between the network data store and the receiving device for streaming the selected prepped content epoch interval by network transport directed to the receiving device.

In another aspect, the multiple encoded representations can comprise representations that are encoded according to an estimated received quality metric. The streaming buffer can comprise a cyclic buffer adapted to contain the multiple encoded representations of the predetermined number of epoch intervals. Alternatively, the streaming buffer can comprise an acyclic buffer. In either guise, the streaming buffer can further include a recursive buffer. In the system, storing into the streaming buffer occurs substantially simultaneously with reading from the streaming buffer, and the streaming and reading are performed according to an epoch interval separation distance that may vary based on network conditions, the levels of the service for individual users and/or levels of services for individual content types and content creators. In addition, the epoch interval separation distance can be determined in accordance with a level of service parameter. The level of service parameter can be related to network latency. The selection of the epoch interval separation distance can be performed in accordance with at least two parameters selected from among current network condition, receiving device configuration, and prepped content type.

In another alternative, selecting can comprise selecting a plurality of prepped content epoch intervals such that each selected prepped content epoch interval is transported to a different one of a plurality of receiving devices.

In yet another alternative, switching among multiple prepped content queues is supported. This enables channel switching by users without interruption to the stream of live content being received. In addition, live insertion of content into the stream of live content is supported, thereby enabling dynamic content insertion such as warning messages or advertisement features or other customized content. Such live insertion features can be implemented with various configurations of the streaming buffer.

Other features and advantages of the present invention should be apparent from the following description of exemplary embodiments, which illustrate, by way of example, aspects of the invention.

DETAILED DESCRIPTION

Figure 1:
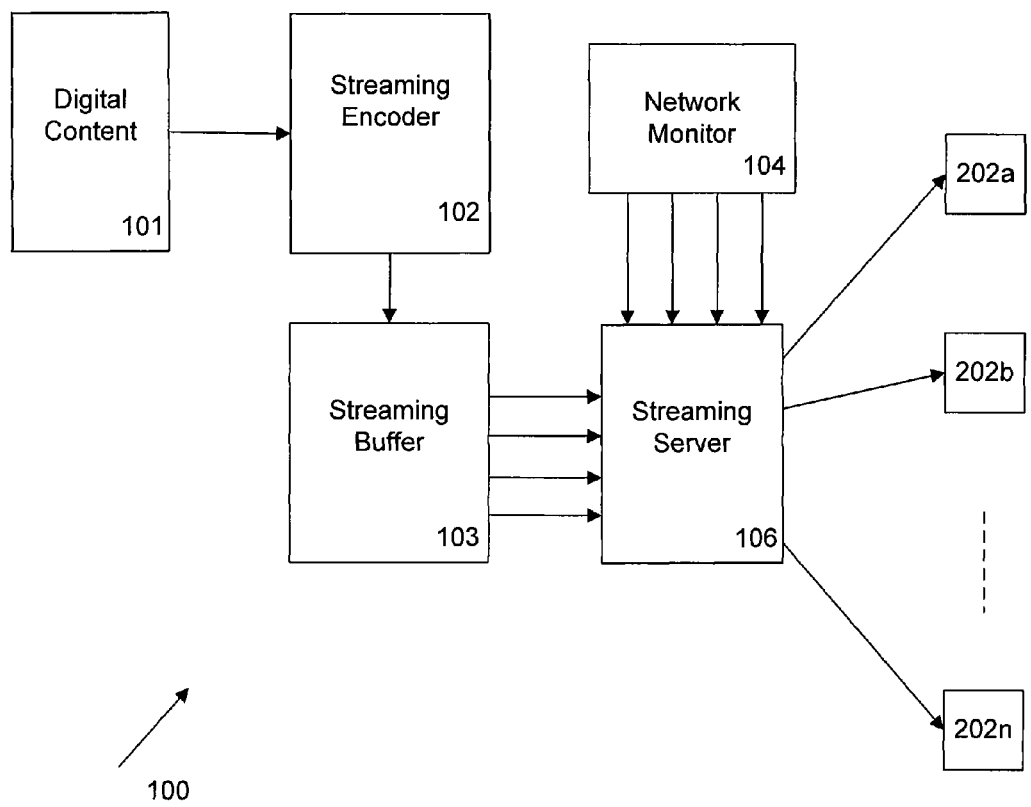
FIG. 1 is a high-level functional block diagram of a processing system constructed in accordance with the present invention, illustrating the data flow in the system.

A high level functional diagram of a processing system 100 constructed in accordance with the present invention is shown in FIG. 1. In the system 100, the functionality of processing is configured whereby digital content 101, such as a live feed, is received at a Streaming Encoder 102 that prepares multiple sets of alternative representations of the live feed, comprising prepped content. The sets of alternative representations are temporarily stored in a Streaming Buffer 103. A Streaming Server 106 selects from the buffer 103 in accordance with current network condition information from a network monitor 104 so as to achieve the best trade-off between quality, bandwidth, and error resiliency for delivery to receiving devices 202a, 202b, . . . , 202n (collectively referred to as the receiving devices 202). In this way, the Streaming Server 106 is adapted to select a stream of live content from the buffer 103 so as to provide a viewing experience that is optimized for conditions at each one of the receiving devices 202.

To populate the Streaming Buffer 103 with prepped content, a window of consecutive segments of the source content clip are examined and encoded by the Streaming Encoder 102, typically using predictive coding compression. The consecutive segments are referred to as epoch intervals. The epoch intervals can have the same predetermined temporal duration. The epoch structure inherently synchronizes all the client sessions with the receiving devices 202 to within the duration of an epoch. In this way, streaming is performed with dynamic and online content adaptation for multiple users with access to the same live broadcast or multicast content.

The system 100 can be deployed in a network adaptation system that monitors network conditions between the streaming source and receiving devices, such as the system described in the co-pending application U.S. patent application Ser. No. 11/467,897 entitled "Network Adaptation of Digital Content" by Debashis Panigrahi et al. filed Aug. 28, 2006. In such a system, the processing and preparation of the content and the customization of the content to fit to different network/device conditions are independently achieved, or orthogonalized, in an optimal way so as to be able to generate customized streams of data without having to store a large number of pre-prepared streams. For example, in a conventional system, to handle network conditions varying between 10 kbs to 200 kbp bandwidth and a frame error rate (FER) between $10^{-1}$ and $10^{-4}$ (measured as erroneous frames/total frames), the number of streams required to be stored can be as high as 800 streams, assuming the bandwidth fluctuates in 5 kbps steps and the range of packet drop has twenty steps within the FER range specified above. In accordance with the present invention, rather than storing 800 streams and dynamically choosing the closest stream based on the network condition, the present techniques process content clips to generate major components or ingredients that are used dynamically to compose customized streams for a wide variety of network conditions and device characteristics. In this way, a stream of data can be composed dynamically for particular network conditions for sending to particular receiving devices. For the example cited above, it is sufficient to store twenty streams in the presented methodology and perform dynamic adaptation to match network conditions. The video content processing of the FIG. 1 system 100 can be implemented according to techniques described in the co-pending application U.S. application Ser. No. 11/467,890 entitled "Digital Video Content Customization" by Sujit Dey et al. filed Aug. 28, 2006.

Thus, the system 100 implements a two-step process in which the encoder 102 processes content clips to create processed clips comprising prepped content that is stored in the Streaming Buffer 103 and from which the Streaming Server 106 will select and choose for optimal rendering results at the receiving devices 202 for the network conditions from the network monitor 104 at the time of network transport (streaming of live content). It is not necessary for the encoder 102 to prepare processed clips that encompass every possible combination and permutation of possible compression parameters, bitrate values, frame rates, and the like. Rather, the encoder can intelligently process the source digital content clips by considering target parameters for a selected network and Quality of Service, system resource availability, equipment capabilities, and the like. The Streaming Server 106 selects from the processed clips at the time of network transport for most efficient delivery, given current network conditions. In this way, the system 100 can scale to different sized installations with a variety of equipment and can maximize efficiency of network resources and quality of service.

In the system 100, the Streaming Encoder 102 and the Streaming Buffer 103 can be configured as components of a Content Creator module, and can be provided in a single integrated component, or can be provided in separate configurations at separate locations, if desired. Alternatively, the Streaming Server 106 can be configured as a Content Customizer, which can incorporate the Streaming Buffer 103, if desired. That is, the digital content clip can be processed by the Streaming Encoder/Content Creator into multiple alternative stream of live contents, and then the processed clip can be composed, or adapted, by the Streaming Server/Content Customizer for the current network conditions, and then transported across the network to a receiving device. The processing of the original input clip can be performed by the Content Creator independently of current network conditions. The input processing can provide prepped content that includes different files for different constituent tracks, where the constituent tracks include source elements such as video, audio, text, and the like. From the processed constituent tracks, a combination can be selected at runtime in response to current network conditions, for more efficient transport across the network to a receiving device. The selected combination comprises a content clip that is adapted for the network conditions to the receiving device at the time of network transport. The selected combination may also comprise a content clip containing an advertisement, a warning message, and the like according to information such as level of service, user profile, and the like. The selection of the combined tracks can be performed by the Content Customizer, as described further below.

Thus, the system 100 uses Streaming Encoders 102 to encode a stream of live content in short epochs, each of which may have multiple alternative representations. These multiple alternative representations are stored in a Streaming Buffer 103. The system includes Streaming Servers 106 that select from among the alternative representations in the Streaming Buffer to provide the live content to receiving devices in accordance with current network conditions and user characteristics, such as receiving device capabilities, user preferences, and user characteristics. The system configuration permits encoding in relatively short epochs as compared with conventional systems, because the multiple representations within an epoch allows the streamer a wide selection in the spatial domain to offset potential coding loss in optimization in the temporal domain due to shorter epochs. With shorter epochs encoded at a finer granularity, the system can respond more quickly to network bandwidth fluctuations without buffering large amounts of content to dampen out network bandwidth fluctuations. As a result, the streaming buffer in the server 106 can be constructed of lesser capacity when compared with buffers in conventional streaming systems. The shorter epochs, in conjunction with the Streaming Server 106 selection of such epochs from among multiple alternative representations, enables the system 100 to better respond to changing network conditions. This reduces the source-to-screen delay (the elapsed time from a digital live content source such as an incoming broadcast signal to viewing at a receiving device). In this way, the available network bandwidth can be more efficiently utilized and network transport can occur at the most efficient transfer rate available. With the illustrated embodiments, the system can achieve source-to-screen delays on the order of one to two seconds.

System Construction and Operation

Figure 2:
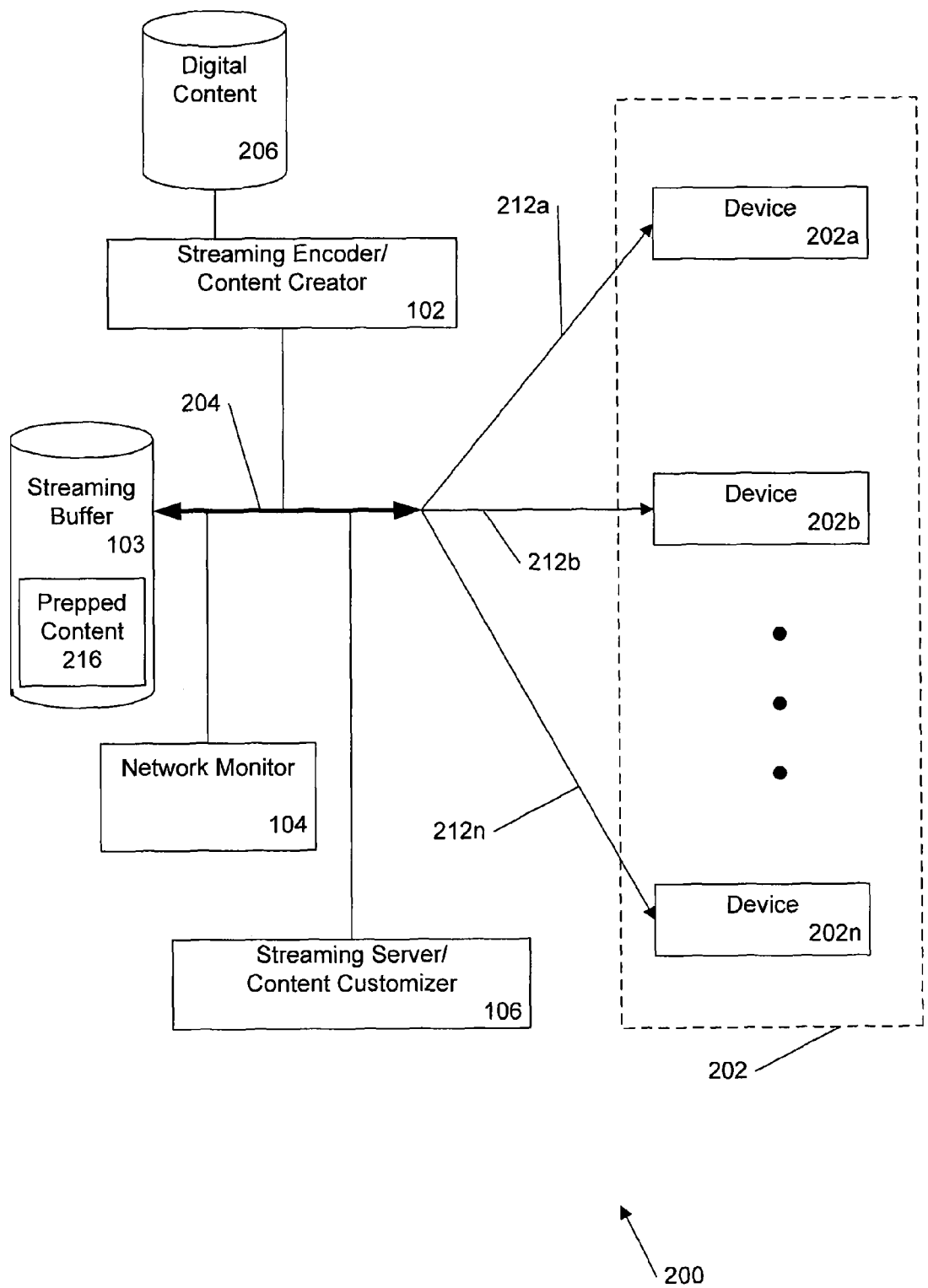
FIG. 2 is a block diagram of a processing system that performs operations in accordance with the present invention.

FIG. 2 is a block diagram of a processing system 200 constructed in accordance with the present invention to carry out the operations depicted in FIG. 1. The block diagram of FIG. 2 shows that the receiving devices 202 receive digital content including video content over a network connection 204. The digital content originates from a digital content source 206 and is processed by the Streaming Encoder/Content Creator 102 in accordance with selected compression parameters and adapted for target network resources/device capability information. The adapted and processed content comprises prepped content, which can be maintained at a Prepped Content store 216 that is separate from the source files 206, or can be at the same network location with the source content files. As illustrated, the prepped content 216 is provided in the Streaming Buffer 103 (FIG. 1) described above. The prepped content is selectively retrieved and combined in response to current network conditions and in accordance with customizing operations (i.e., customized) by the Streaming Server/Content Customizer 106. The receiving devices include a plurality of devices 202a, 202b, ..., 202n, which will be referred to collectively as the receiving devices 202.

For each one of the receiving devices 202a, 202b, ... 202n, the Content Customizer 106 determines a set of customizing operations that specify multiple streams, or paths, of customized digital content data in accordance with available network resources, and selects one of the customized data streams from the prepped content 216 in accordance with network conditions as a function of estimated received quality. The current network conditions for each corresponding device 202a, 202b, ..., 202n are determined by the Network Monitor 104 that is located between the prepped content buffer 216 (i.e., the source of the customized clips) and the respective receiving devices. The Content Customizer 106 can apply the selected customizing operations to the available digital content from the content source 206 and can provide the customized video stream to the respective devices 202, or the Content Customizer can communicate the selected customizing operations to the Content Creator or to a processor at the Prepped Content 216, which can then apply the selected customizing operations and provide the customized data stream to the respective devices. In either case, the Network Monitor 104 can be located anywhere in the network between the prepped content 216 and the devices 202, and can be integrated with the Content Customizer or can be independent of the Content Customizer.

The network devices 202a, 202b, ..., 202n can comprise devices of different constructions and capabilities, communicating over different channels and communication protocols. For example, the devices 202 can comprise telephones, personal digital assistants (PDAs), computers, or any other device capable of displaying a digital video stream comprising multiple frames of video. Examples of the communication channels can include Ethernet, wireless channels such as CDMA, GSM, and WiFi, or any other channel over which video content can be streamed to individual devices. Thus, each one of the respective receiving devices 202a, 202b, ..., 202n can receive a corresponding different customized video content sequence of frames 212a, 212b, ..., 212n. The frame sequence can be streamed to a receiving device for real-time immediate viewing, or the frame sequence can be transported to a receiving device for file download and later viewing.

Figure 3:
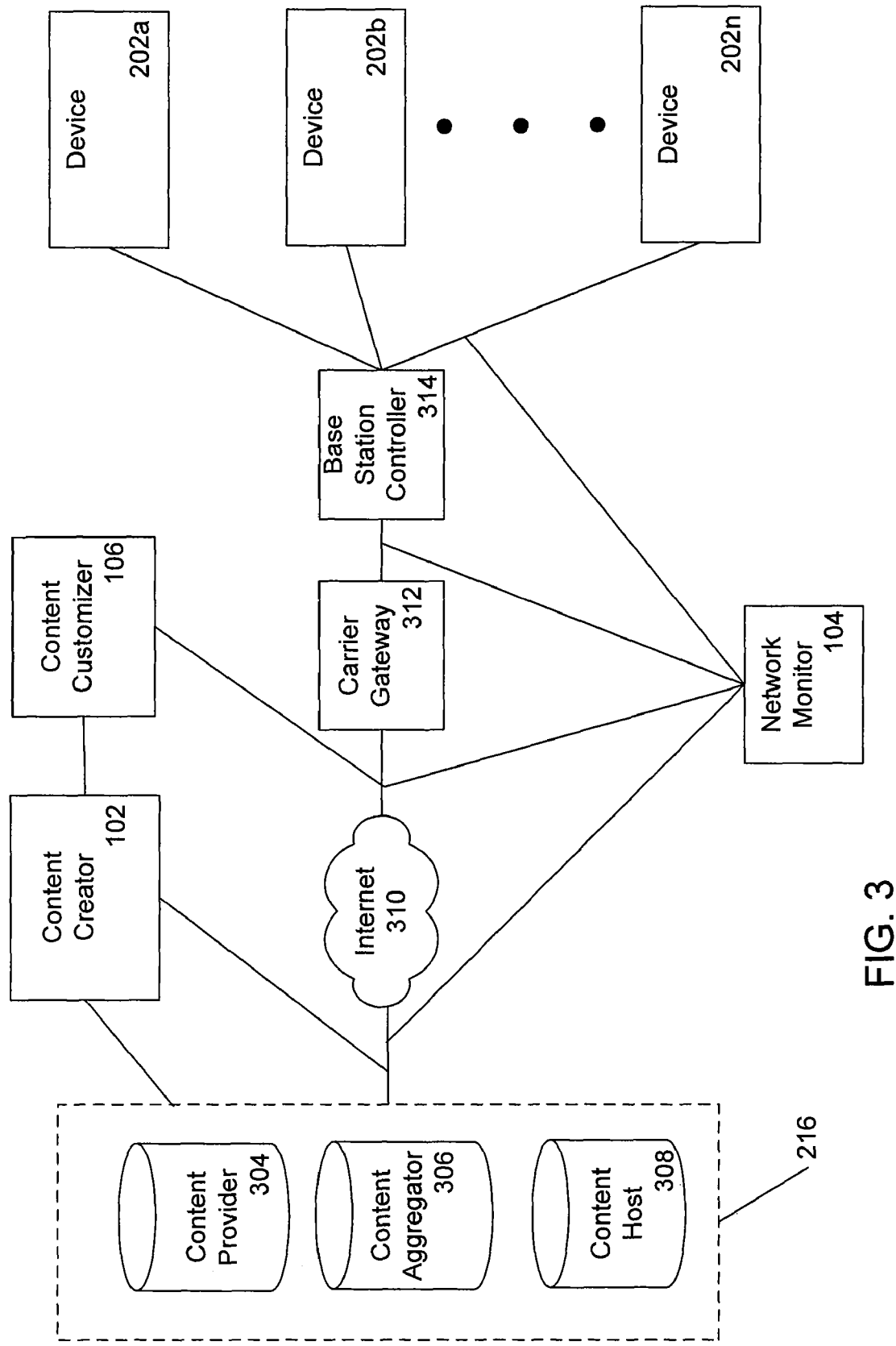
FIG. 3 is a block diagram of a network configuration in which the FIG. 2 system operates.

FIG. 3 is a block diagram of a network configuration 300 in which the FIG. 1 system operates. In FIG. 3, the receiving devices 202a, 202b, ..., 202n receive digital content that originates from the Prepped Content 216, which is indicated as including digital content source files from a content provider 304, content aggregator 306, and content host 308, from which the prepped content is produced. As noted above, the original digital content 206 can be located with the prepped content 216 as illustrated in FIG. 3, or can be located at a different network location (such as illustrated in FIG. 2). The prepped content to be processed according to the Content Customizer is retrieved from the Prepped Content 216, and can originate from any of these sources 304, 306, 308 for preparation by the Content Creator. Thus, FIG. 3 shows the Content Creator 102 in communication with the Prepped Content 216, and shows the Content Customizer 106 in communication with the Content Creator 102. The sources 304, 306, 308 can provide content that includes video content, audio content, multimedia files (such as MPEG-4, AVI, WMV, RM, and the like), Web content (including HTML, XHTML, WAP, and the like), and streaming of live content data (such as multimedia streaming files, MPEG-4, MP3, HDTV, live NTSC, PAL, and SECAM content), and the like. Communications between the Content Creator and Content Customizer can occur directly by physical connection or by installation on the same computer, or can occur between two computers that communicate over a network such as a LAN or the Internet. In the FIG. 3 illustration, the receiving devices 202 comprise wireless communication devices. FIG. 3 shows that the typical path from the prepped content 216 to the receiving devices 202 extends from the prepped content, over the Internet 310, to a carrier gateway 312 and a base station controller 314, and then to the receiving devices. The communication path from prepped content 216 to devices 202, and any intervening connection or subpath, will be referred to generally as the "network" 204.

FIG. 3 shows the Content Customizer 106 communicating with the content sources 206 and with the network 204. The Content Customizer can be located anywhere in the network so long as it can retrieve prepped content 216 and can communicate with a network connection from which the customized video content can be transported to one of the devices. That is, the carrier gateway 312 is the last network point at which the digital content can be modified prior to transport to the receiving devices, and therefore FIG. 3 shows the Content Customizer 106 communicating with the network (Internet 310) upstream or prior to the gateway 312.

Streaming Encoder/Content Creator Construction

Figure 4:
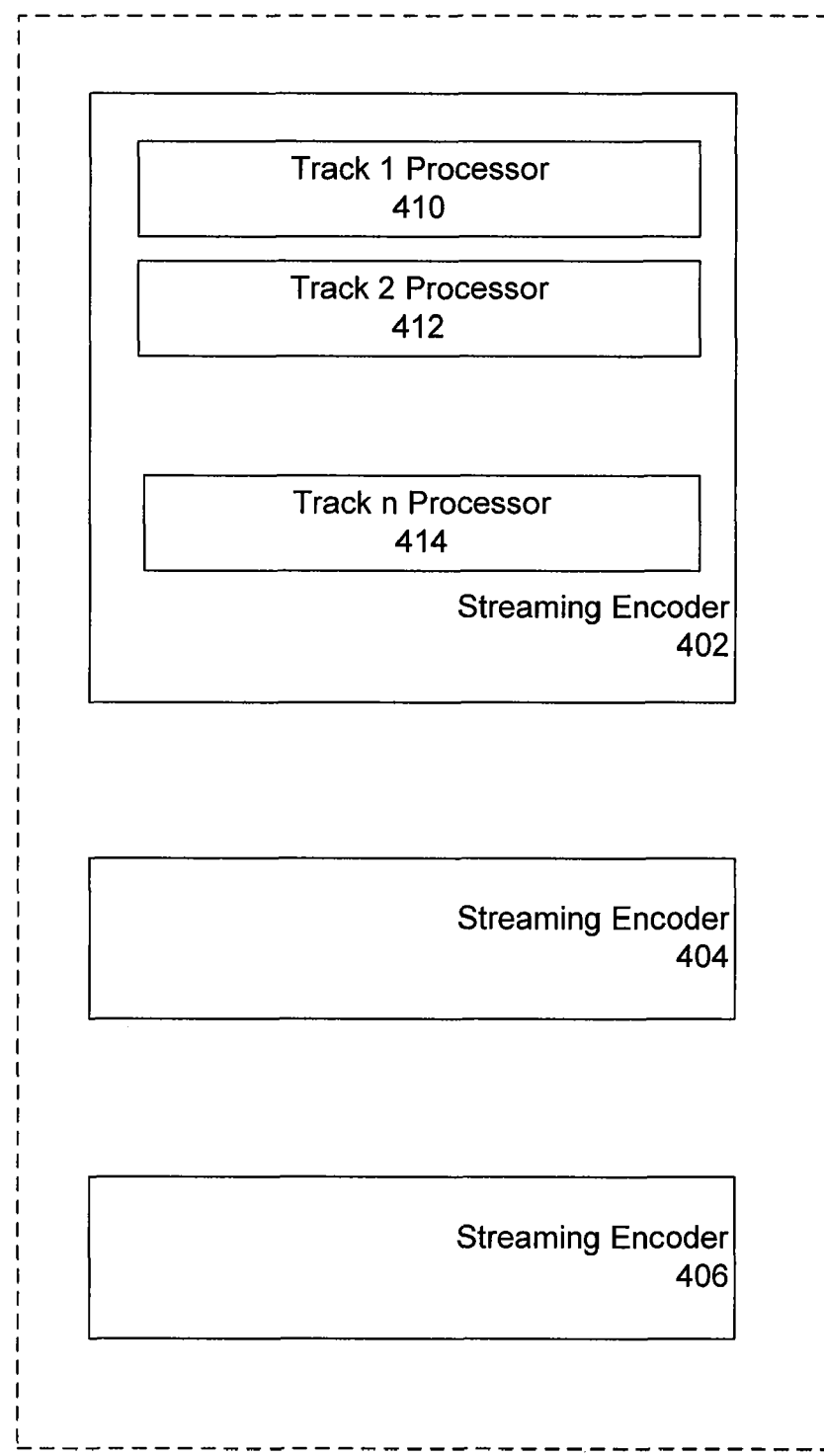
FIG. 4 is a block diagram that illustrates the construction of the Streaming Encoder/Content Creator.

FIG. 4 is a block diagram that illustrates the construction of the Streaming Encoder/Content Creator 102. FIG. 4 indicates that the encoder 102 (indicated by dashed lines) can include multiple independent encoders 402, 404, 406. Only three encoders are illustrated in FIG. 4, but it should be understood that the Streaming Encoder/Content Creator 102 can include a greater or lesser number of encoders 402-406. That is, the encoders 402-406 are collectively referred to as the Streaming Encoder/Content Creator 102, but the encoders can be implanted as independent modules. Moreover, the encoders 402-406 can be dispersed at locations throughout the network, or can be co-located (installed) at the same computer device. Each of the encoders has a similar construction, details of which are illustrated for the first encoder 402. Each encoder includes multiple track processors 410, 412, 414, each of which encodes a different one of the constituent tracks of a source digital content clip. For example, a source content can include a video track, an audio track, and a closed caption track. Each of these constituent track types will be encoded by one of the track processors 410-414.

Each of the encoders 402-406 receives the digital content clip in segments comprising frames of video data and corresponding constituent tracks, or the digital content clip may be received in epoch intervals. The encoders process the source digital content and write the encoded segments into the Streaming Buffer 103. As noted above, the encoded segments are written into the buffer as epoch intervals. All of the epoch intervals in the Streaming Buffer are of the same duration, so that all epoch intervals in the buffer will be synchronized together. Each of the encoders will produce a collection of alternative encoded representations of the source content. The alternative encodings will comprise constituent ingredients having alternative compression parameters and the like, from which the Streaming Server/Content Customizer will select for network transport. One exemplary implementation of such encoding processing is described in the co-pending application entitled Network Adaptation of Digital Content by D. Panigrahi et al.

If desired, the functionality of the Streaming Encoder/ Content Creator 102 can be implemented by encoders arranged in a cascade arrangement instead of or in addition to a parallel arrangement. Thus, the output of one encoder 402 can be provided as input to a subsequent encoder 404. This may be desirable, for example, where relatively complex processing is required, or if multiple processing passes are required. Those skilled in the art will be able to determine the best configuration for the system resources that are available.

Streaming Buffer Construction

Figure 5:
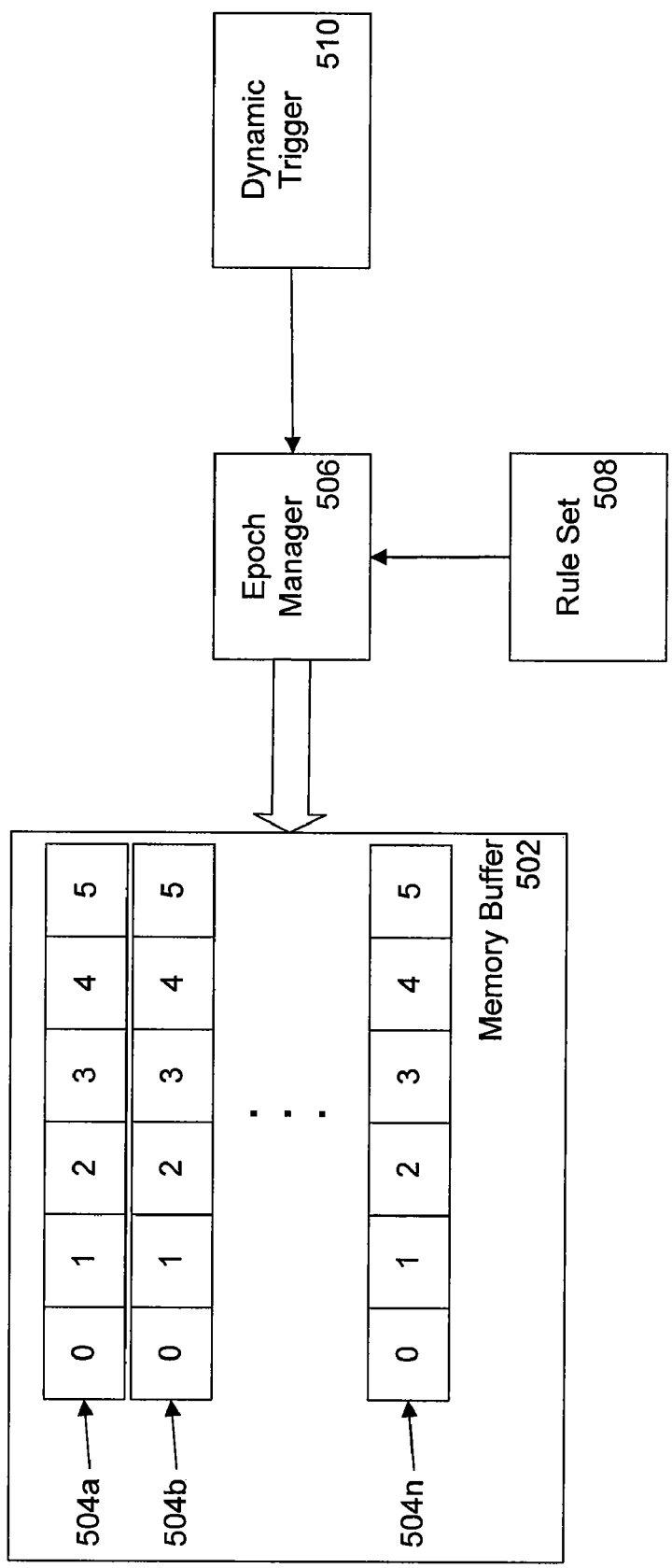
FIG. 5 is a block diagram of the Streaming Buffer construction.

FIG. 5 is a block diagram of the Streaming Buffer 103 construction. FIG. 5 shows that the buffer 103 includes a memory buffer 502 with multiple epoch queues 504a, 504b, 504n. Each of the epoch queues contains encoded alternative representations received from the Streaming Encoder/Content Creator 102 illustrated in FIGS. 1-4. Each epoch queue contains multiple alternative encodings for a different digital content clip. For example, one of the queues 504a might contain alternative representations for a live feed from a particular television channel with a network broadcast, such as NBC, ABC, CBS, or FOX in the U.S.A., while another queue 504b might contain alternative representations from a different network broadcast or for a channel of cable television programming.

Thus, a first queue location "0" of the first queue 504a contains multiple alternative representations for the "0" epoch interval. The second queue location "1" of the first queue contains multiple alternative representations for the "1" epoch interval, and so forth. The second queue 504b would contain multiple alternative representations for the "0" epoch interval of its respective channel in its "0" queue location, and likewise for the other queue locations of the second queue 504b and for the other queues and their respective queue locations.

FIG. 5 shows that the Streaming Buffer 103 includes an epoch manager 506, which controls access to the buffer queues 504a, 504b, . . . , 504n of the memory buffer 502. The epoch manager can control both write access by the Streaming Encoder 102 and read access by the Streaming Server 106. The epoch manager 506 can implement access control to the buffer 502 in accordance with a rule set 508 comprising processing rules that are specified in terms of Boolean logic conditions with qualifiers such as "greater than", "less than", and "equal to". The epoch manager also can implement access control in response to dynamic triggers 510 that may be generated by system conditions, such as interrupt signals or listener methods, or may be generated by user actions, such as keyboard inputs requests from peripheral equipment. Thus, if the epoch manager receives a dynamic trigger such as an emergency signal, the epoch manager might respond by loading predetermined content into the queue or by granting queue access to a content provider.

Figure 6:
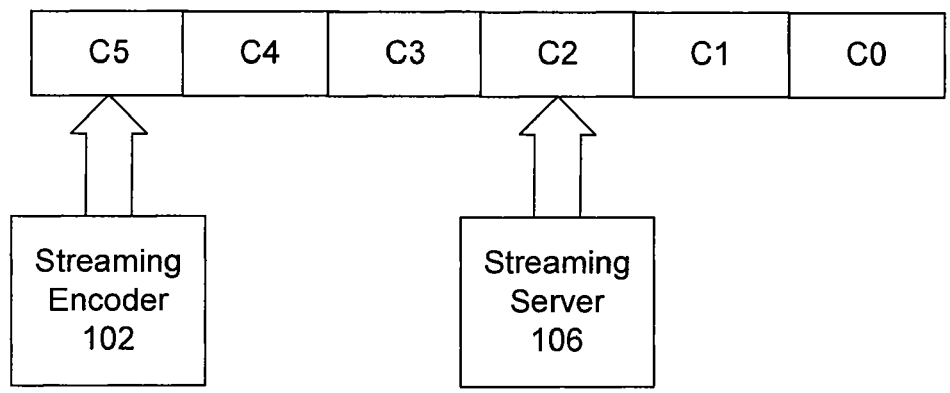
FIGS. 6, 7, and 8 illustrate operation of the memory buffer under control of the epoch manager for one of the epoch queues shown in FIG. 5.
Figure 7:
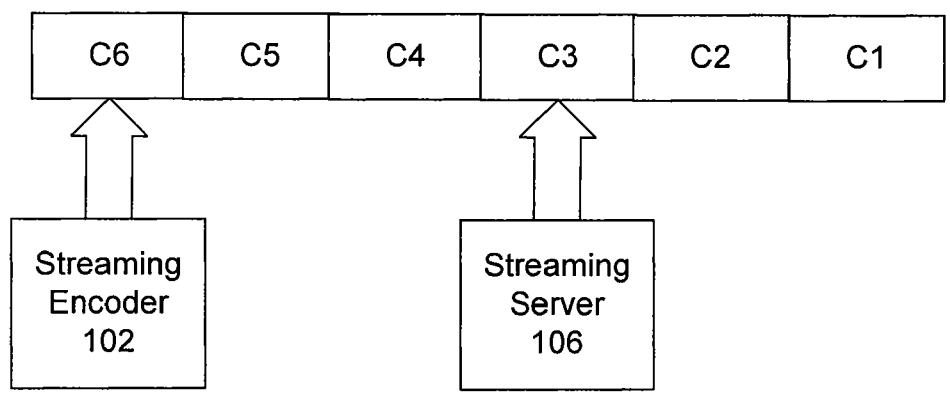
Figure 8:
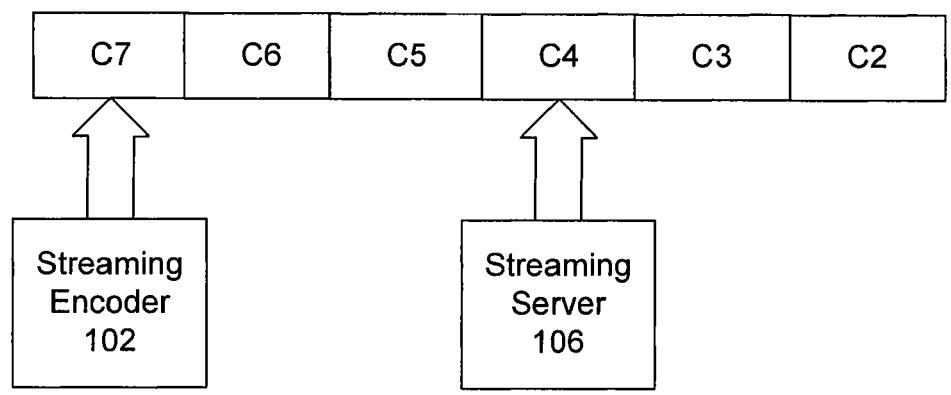

FIGS. 6, 7, and 8 illustrate operation of the memory buffer 502 under control of the epoch manager 506 for one of the epoch queues 504 shown in FIG. 5. FIG. 6 shows six locations of the queue 504 that contain epoch intervals, comprising content that is numbered "C0" through "C5" for purposes of illustration. FIG. 6 shows that the Streaming Encoder 102 is writing to the last (newest) location at the left end of the illustrated queue, identified as containing epoch interval "C5" in the queue. At the same time, the Streaming Server 106 is reading from a location spaced away from the writing action, to the right in the illustration, at the location identified as containing epoch interval "C2" in the queue. Thus, the encoder 102 and the streamer 106 are sharing the same epoch queue and are writing and reading, respectively, at substantially the same time. The epoch manager 506 is enforcing a separation distance of three queue locations so the encoder and streamer do not interfere with operations of the other. A different separation distance may be enforced by the epoch manager, depending on system resources, configuration, and desired level of service.

FIG. 7 shows the next write/read sequence of operations, where the encoder 102 is writing a new epoch interval, identified as the location containing epoch interval "C6" in the queue, while the streamer 106 is now reading from the location identified as containing epoch interval "C3" in the queue. The "C0" epoch interval is not illustrated in FIG. 7, indicating that the "C0" epoch interval has expired or has otherwise been deleted from the queue to make room in the queue for new epoch intervals. Thus, as each new epoch interval is written into the queue by the encoder, the oldest epoch interval in the queue expires and is deleted. The epoch manager 506 attends to queue upkeep and deletion of expired epoch intervals. It should be understood, as explained above, that each location 0, 1, 2, . . . , 5 of the queue 504 contains alternative encoded representations of a particular channel or content clip.

FIG. 8 shows the next write/read sequence, where the encoder 102 is writing the next epoch interval to the queue location identified as containing the "C7" epoch interval while the streamer 106 is reading from the queue location identified as containing the "C4" epoch interval. Thus, as noted, the epoch manager 506 maintains a constant separation between the queue locations being accessed by the encoder and the streamer. The separation distance can be maintained as a function of a service parameter such as system requirements, for example where the encoder and streamer are in geographically distant locations and a greater separation is needed to a desired maximum network latency for uninterrupted operation by the two. Alternatively, the service parameter separation distance can be maintained as a function of a service parameter comprising a user level, such as where users can subscribe to a subscription level of service and receive enhanced processing that involves greater separation.

Streaming Server/Content Customizer Construction

Figure 9:
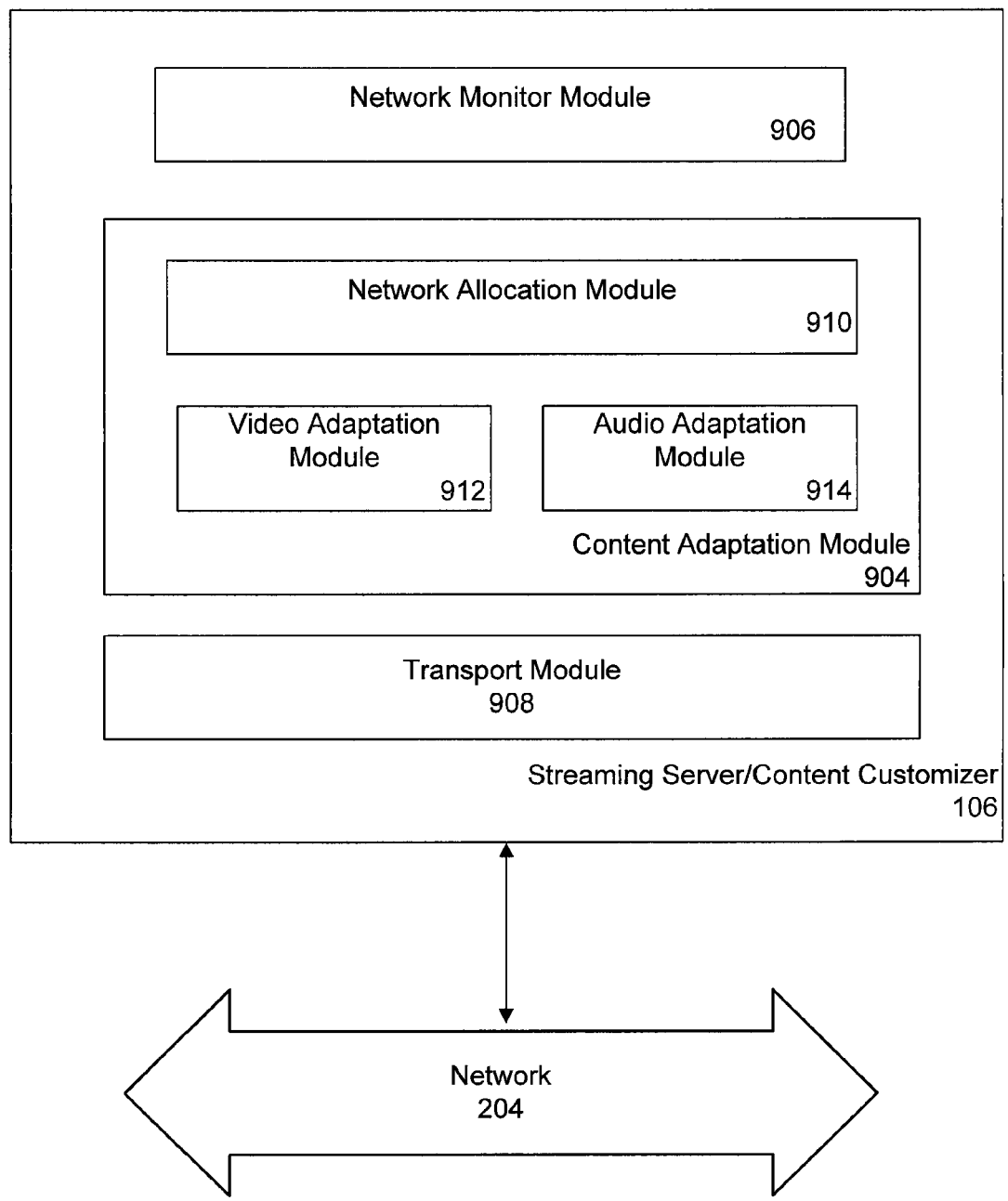
FIG. 9 is a block diagram of the components for the Content Customizer illustrated in FIG. 2 and FIG. 3.

FIG. 9 is a block diagram of the components for the Streaming Server/Content Customizer 106. FIG. 9 shows that the Streaming Server/Content Customizer includes a Content Adaptation Module 904, an optional Network Monitor Module 906, and a Transport Module 908. The Network Monitor Module 906 is optional in the sense that it can be located elsewhere in the network 204, as described above, and is not required to be within or incorporated with the server 106. That is, the Network Monitor Module can be independent of the server, or can be integrated into the server as illustrated in FIG. 9. The Transport Module 908 delivers the customized video content to the network for transport to the receiving devices. As noted above, the customized content can be transported for streaming or for download at each of the receiving devices.

The Content Adaptation Module 904 customizes the stream (sequence of frames) for the receiving device based on the network information collected by the Network Monitor Module 906. FIG. 9 shows that the Content Adaptation Module 904 includes a Network Allocation Module 910, a Video Adaptation Module 912, and an Audio Adaptation Module 914. The Content Adaptation Module 904 includes adaptation modules for each track type of the digital content files to be handled. In the illustrated system, the digital content will include video tracks and audio tracks, and therefore FIG. 9 shows the Content Adaptation Module 904 with a Video Adaptation Module 912 and with an Audio Adaptation Module 914. In general, the adaptation modules of the system will correspond to the processing modules of the encoder 102. As noted above, at the time a content file is to be transported over the network 204, the server 106 will dynamically select combinations of prepped content in accordance with current network conditions. Within the Streaming Server/Content Customizer 106, the adaptation modules 912, 914 will perform the selection of combinations for their respective track types.

The Transport Module 908 is responsible for assembling or stitching together a customized stream (sequence of frames) based on the decisions by the Content Adaptation Module and is responsible for transferring the assembled sequence of customized frames to the receiving device using the preferred mode of transport. Examples of transport modes include progressive downloads such as by using the HTTP protocol, RTP streaming, and the like.

Encoder Operation

Figure 10:
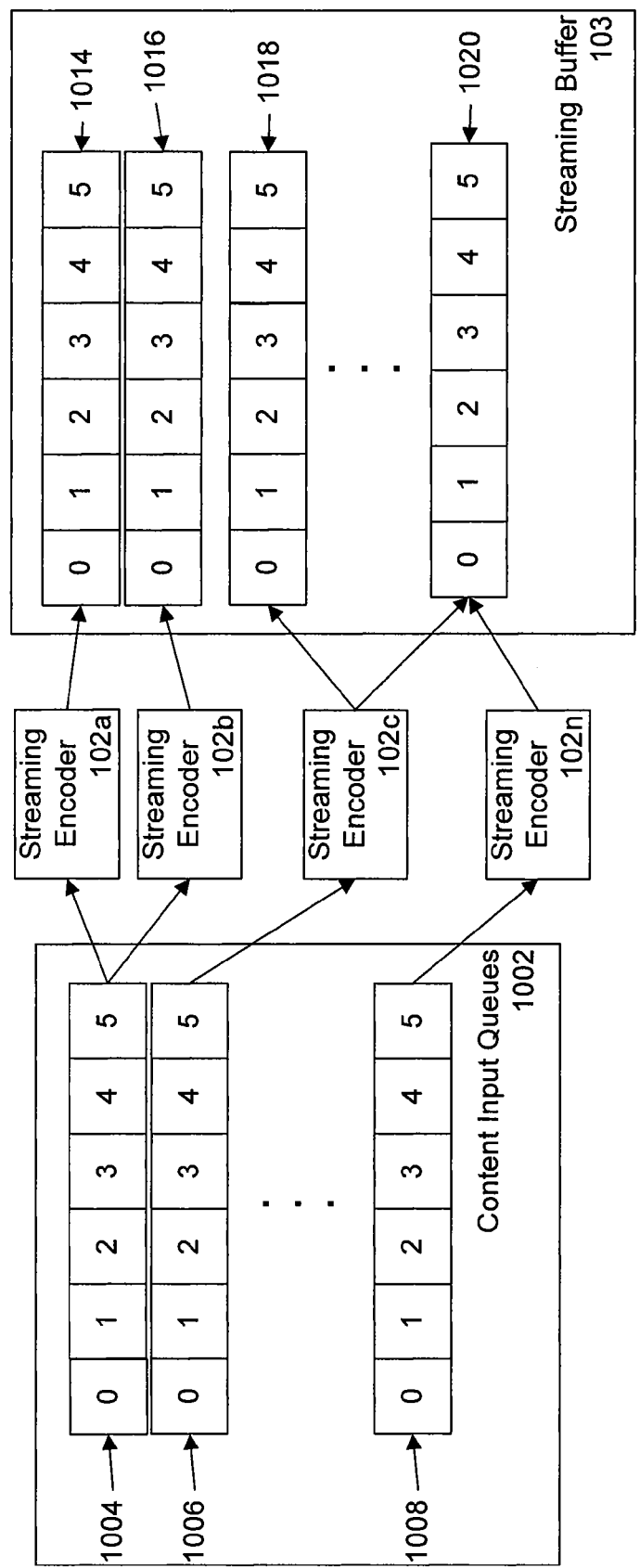
FIG. 10 is a depiction of the Streaming Encoder/Content Creator configuration with respect to the source digital content files and the Streaming Buffer.

FIG. 10 is a depiction of the Streaming Encoder 102 configuration with respect to the source digital content files and the Streaming Buffer 103. The source digital content files are represented by the Content Input Queues 1002, which comprise the digital content clips that are processed by the encoder 102 into alternative representations and are stored into the Streaming Buffer 103. FIG. 10 shows three input queues 1004, 1006, 1008 for purposes of illustration, but a greater or lesser number of queues can be provided, as indicated by the ellipses. Similarly, six queue locations 0, 1, 2, . . ., 5 are illustrated for each input queue, but a greater or lesser number of queue locations can be provided. FIG. 10 shows that multiple encoders 102a, 102b can process from the same digital content source 1004 at the same time. Alternatively, a single encoder 102c can be assigned to a single digital content source 1006 for processing. FIG. 10 shows each encoder 102a, 102b, 102c writing to a different respective epoch queue 1014, 1016, 1018 of the buffer 103 while two encoders 102c, 102n are writing to the same epoch queue 1020. Thus, multiple encoders can write to the same buffer queue, and multiple encoders can process input from the same input queue.

Server Operation

Figure 11:
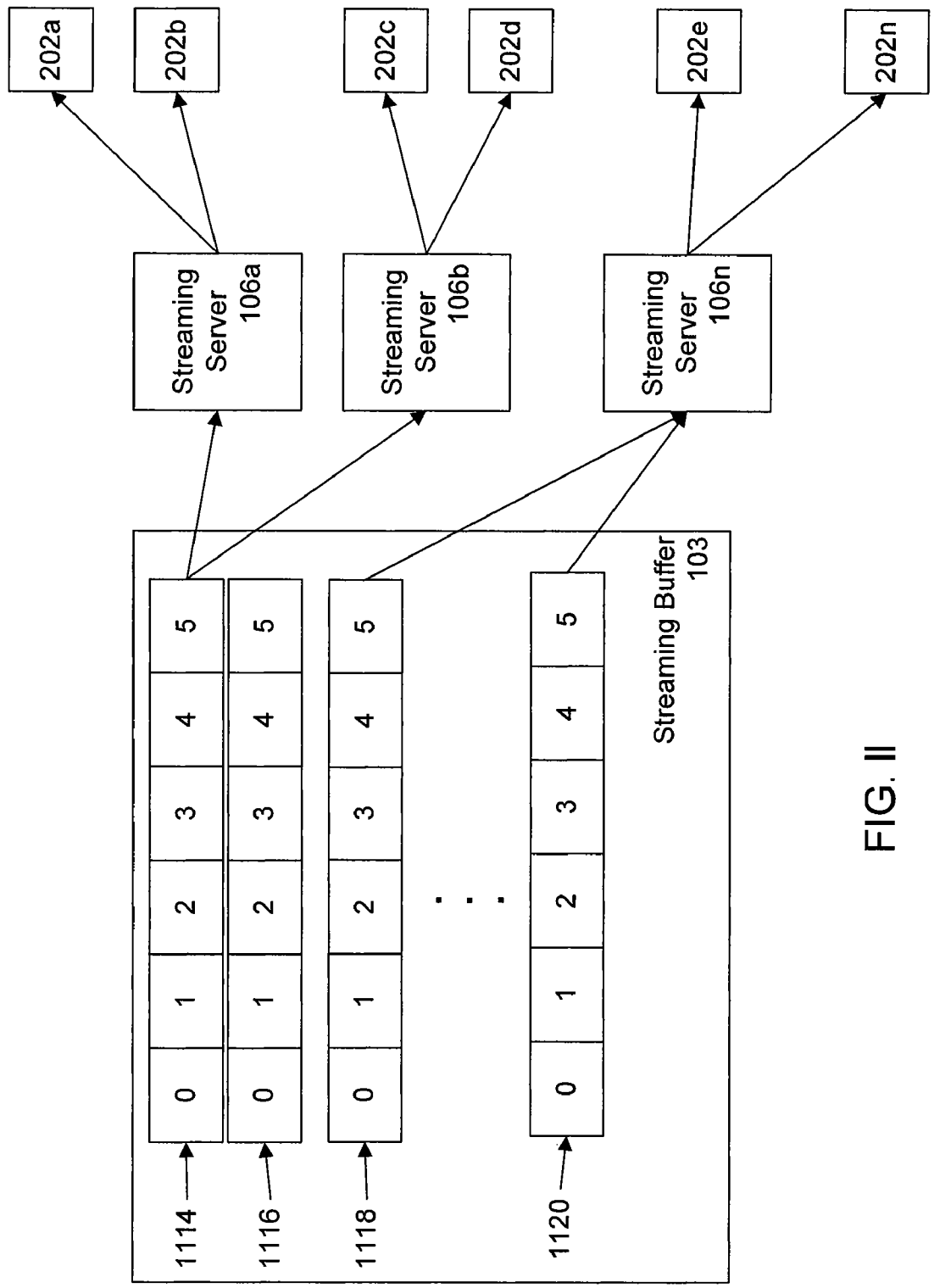
FIG. 11 shows the configuration of the Streaming Server/Content Customizer with respect to the receiving devices and the Streaming Buffer.

FIG. 11 shows the configuration of the Streaming Server/Content Customizer 106 with respect to the receiving devices 202 and the Streaming Buffer 103. As noted above, the server 106 can comprise multiple independent servers 106a, 106b, . . ., 106n. The buffer 103 can include multiple epoch interval queues 1114, 1116, 1118, 1120 and the epoch manager 506 (FIG. 5) controls access to the queues of the buffer 103 by the server 106. FIG. 11 shows that multiple servers 106a, 106b can have access to the same epoch queue at the same time for streaming operations. Alternatively, one server 106n can be granted exclusive access to a particular epoch queue 1118. In general, the epoch manager will assign servers to queues as the streaming of live content needs dictate. For example, if a particular encoded clip is greatly requested by users, then additional servers may be assigned to the same epoch queue to support the additional output streams that will be necessary to satisfy the demand. FIG. 11 also shows that each of the servers 106 can stream multiple epoch intervals to multiple receiving devices.

When the encoders 102 process the input files and generate the prepped content, they receive the input files in the native format of the files (such as video frames) but in a configuration according to the epoch structure described above. All of the encoders will be processing the same epoch for a given source clip at the same time. The processing of the epochs, in terms of which epoch will be read by the encoders at a given time, is determined based on a rule set according to which each encoder/streamer operates. One particular implementation of this rule set in the illustrated embodiment is based on four mandatory parameters and two optional parameters. The first mandatory parameter is a counter value "TR", such as a clock count. In the FIG. 1 system, a monotonically increasing (or decreasing) counter is utilized. This counter is accessible from any writer/reader that is interested in accessing the epoch queue. Examples of suitable counters include UTC (or time_t/time_t64 types under C++), time value from a "Pentium" computer processor clock (i.e., a 64-bit counter), or Society of Motion Picture and Television Engineers (SMPTE) Linear Time Code (LTC). In practice, the UTC time is typically chosen, because there exists a very simple protocol called Network Time Protocol (NTP) that distributes an accurate UTC time to all interested parties, as known to those skilled in the art. The use of a computer processor counter, e.g. a "Pentium" processor counter, is more appropriate for a non-distributed system of writers/readers. The SMPTE LTC is widely used in the broadcast/cable television industry and it is commonly distributed as an audio signal to the synchronized devices, so a dedicated hardware interface is needed on both the encoder and the streaming server to decode the LTC information.

The second mandatory parameter of the illustrated embodiment is the epoch duration value, "DR". The epoch duration value can be expressed in seconds, or steps (as in the case of a system clock counter such as a "Pentium" clock counter). The third mandatory parameter that determines the current epoch being processing is the number of epochs "NE" currently in the queue. This number ordinarily is set to be smaller than the maximum value of the counter TR. It is possible to set this NE value to a value that is effectively infinity, in which case the queue will operate as an infinite (or acyclic) queue. Conversely, if the number of epochs is set to a finite number that is smaller than the maximum value of the counter value TR, the queue will operate as a cyclic queue. The fourth mandatory parameter for determining the epoch number for processing is an offset value, where an offset is assigned to each writer/reader. The offset value does not have to be unique for the readers (servers), but it should be unique for the writers (encoders). For each writer/reader to determine which epoch it should be accessing, the following formula "Equation 1" can be used:

$$\text{Epoch} = ((TR - OF*DR)\%(DR*NE))/DR \quad (\text{Eq. 1})$$

where the equation parameters are as defined above: TR=Counter value (first mandatory parameter); DR=Duration of an epoch (second mandatory parameter); NE=Number of epochs (third mandatory parameter); OF=Offset value (fourth mandatory parameter). In Equation 1, the "%" operator is an integer remainder operator that involves division of the second argument into the first argument, with the operator returning the integer remainder. Those skilled in the art will be able to determine alternate formulations of the parameters to determine current epoch for processing.

An example of epoch queue processing using the equation above is provided, using the following values:
TR=1000
DR=4
NE=6
Writer OF=0
Reader OF=3
Epoch of Writer=((1000−0*4)%(6*4))/4=4
Epoch of Reader=((1000−3*4)%(6*4))/4=1

Thus, the input queue writer (encoder) is at epoch number 4, while the streaming reader (server) is at epoch number 1, and an offset of three between them is maintained. To support multiple writers to the same queue, it is useful to use either one of these two additional parameters: a) a step scheme, wherein step allows each writer to skip writing certain epochs to avoid collisions with another writer. For example, two writers with offset of 2 and 3 respectively can avoid colliding with each other by given a step of 2. Then a writer with offset of 2 will always write to an even-numbered epoch 0, 2, 4 only while a writer of offset=3 will only write to an odd-numbered epoch 1, 3, 5. In practice, this is very inflexible. Another alternative for supporting multiple encoders is a write enable scheme: b) Write-enable—This needs to be supplied by a central rule manager to each of the writers. In the case of a single queue, the rule manager must ensure that Write-enable is asserted for one of the writer at any point in time to avoid collision. Write-enable can also be supplied offline and ahead of time to each of the writers. The simplest way to represent this is to use the concept of an absolute epoch (with NE=infinity). Given the above equation Eq. 1, when NE=infinity, then $$\text{AbsoluteEpoch} = ((TR - OF*DR)\%(DR*NE))/DR = (TR - OF*DR)/DR \quad (\text{Eq. 2})$$

Those skilled in the art will understand that NE can be set to a suitably large, predetermined value to provide a value that the system will be configured to recognize as an "infinity" value. The writer can be given a list of absolute epochs to determine whether it can write to its epoch at a particular point in time. In the case of a single reader (server) accessing multiple queues, the reader should be assigned an offset that is compatible with all writers in each of the queues. For example, if Queue 1 has a writer with offset=0 and Queue 2 has a writer with offset=1, then the reader can be assigned offset=2 to avoid collision with any of the writers (assuming that NE/DR values are the same for all the queues).

In another embodiment, the epoch queue can be configured to provide a recursive queue. The recursive queue configuration builds on the configuration described above, so that each of the epoch slots in the queue can be further divided into a sub-queue. More particularly, when the Streaming Buffer 103 is configured according to the rule set as described above to provide a "primary" buffer, the Epoch Manager can configure each of the epoch slots of the primary buffer so that the epoch slot is associated with data store locations that provide a secondary buffer. That is, each epoch slot of the primary buffer can be associated with one or more epoch slots of a secondary buffer. The construction is illustrated in FIG. 12.

Figure 12:
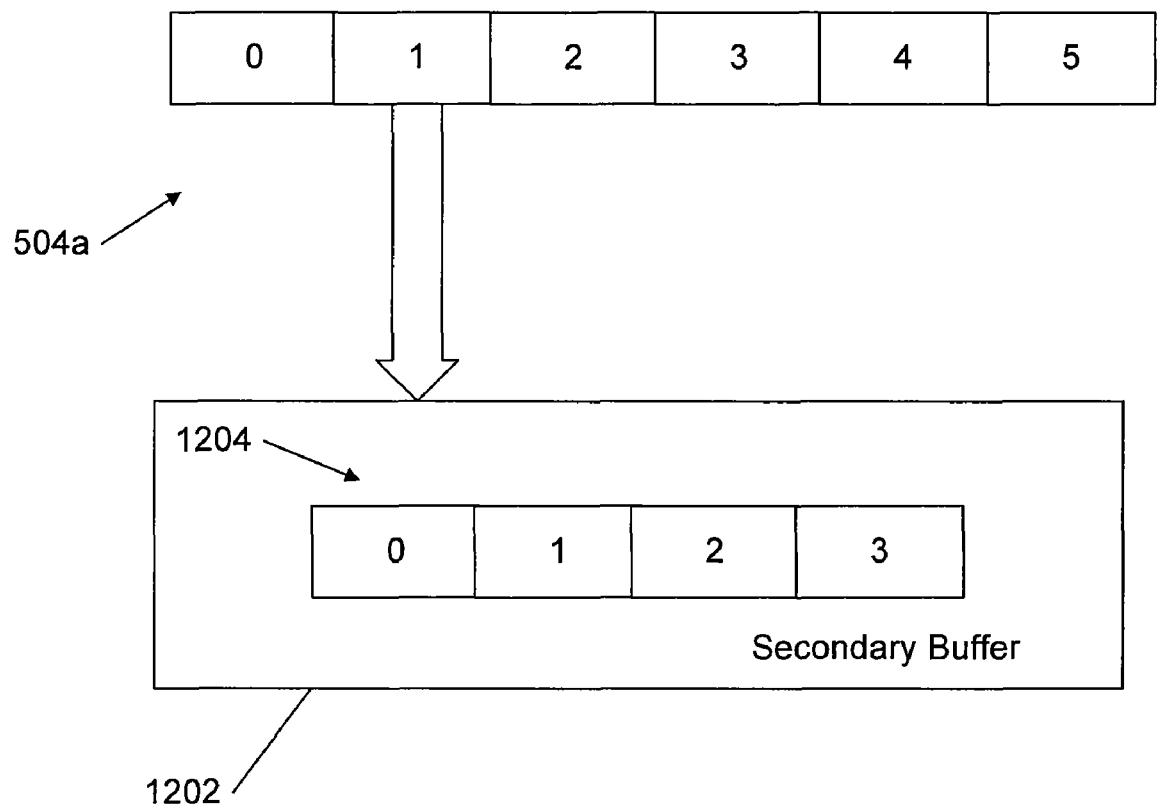
FIG. 12 is a block diagram that illustrates an alternative construction for the Streaming Buffer of FIG. 5, providing a recursive buffer construction.

FIG. 12 shows such that additional slots in a secondary buffer can be referenced from the epoch slots of the primary buffer. In FIG. 12, a queue 504a from the Streaming Buffer 103 is shown with the second epoch slot "1" indicated with an arrow that indicates an association with the secondary buffer 1202, which contains a lower level epoch queue 1204 having four epoch slots indicated as "0", "1", "2", and "3". The lower level epoch queue 1204 has parameters such that TR=UTC, NE=4, and DE=8 seconds. There is no "OF" value associated with the lower level queue. When the primary, top level queue 504a is called by the epoch manager 506, the "1" epoch slot can provide the lower level queue association so that content can be recorded and streamed at a finer granularity in the sub-queue. Thus, one of multiple epoch slots in the primary epoch queue can call a secondary queue that itself has multiple epoch slots, thereby providing a recursive configuration for the Streaming Buffer.

The FIG. 12 recursive configuration for the Streaming Buffer is especially suited to insertion of alternate or multiple content clips within an epoch interval. One example of multiple clips is the insertion of an advertisement in streaming of live content output from the buffer. For insertion of advertising, a top level epoch queue is defined and one particular epoch slot is selected for insertion of the advertising. Within that selected epoch, the epoch manager can insert advertising content of relatively short duration in finer granularity to the epoch queue. Thus, the epoch manager can insert advertising clips and the like according to local schedules, or according to receiving device parameters, or network location, and the like. Clips of other content can be inserted, such as public service announcements, emergency bulletins, and the like. In this way, the clips in the lower level queue can be changed more frequently than the streaming content from the primary buffer, or greater numbers of clips of shorter duration than the primary streaming content can be easily added into the stream of live content from the primary buffer. Such insertions or substitutions can be accomplished in a seamless fashion, without interruption to the streaming output of the primary content.

The recursive buffer supports a variety of embedded epoch scenarios in which an epoch is read out from within an epoch. For example, as noted above, the streaming buffer contains a plurality of queue slots, each of which stores an epoch interval of prepped content. In the case of a recursive buffer, one of the queue slots contains a pointer or other association from the streaming buffer to the recursive buffer. The recursive buffer can be configured to be contained within the same system data store as the streaming buffer. In accordance with an embodiment, the recursive buffer contains a plurality of lower level queue slots. The lower level queue slots can contain prepped content that is read from the recursive buffer when the corresponding prepped content epoch interval is selected from the streaming buffer. Thus, alternate content such as an advertisement or emergency bulletin, advertisement, or announcement can be automatically read out to the receiving device upon selection of a streaming buffer queue slot from which the selected content would otherwise be read.

The illustrated system constructed in accordance with the present invention facilitates changing of content streams, such as changing the channel of content being viewed. That is, a user at a receiving device will experience a channel change (and will receive content from a channel different from the channel previously being viewed) when prepped content is switched from a selected prepped content epoch interval to a different prepped content epoch interval corresponding to an encoded different digital content clip. The user at a receiving device can make a channel change, such as selecting a new broadcast channel to view, by actuating appropriate controls in accordance with the viewing device. For example, the user can select channel up or channel down, and the system will receive the corresponding commands at the streaming buffer and cause the appropriate change in queue from which content will be streamed to the receiving device.

In accordance with the invention, the different prepped content epoch interval can be selected with no change to the selected prepped content epoch interval of the streaming buffer. That is, switching channels may occur without a change to the selected channel of the streaming buffer. For example, a user at a receiving device may have selected a desired channel and may be viewing the streamed content when switching of the channel is initiated without action by the user. The switching may occur in response to characteristics of the receiving device, or may occur in response to a cue in the prepped content itself. The device characteristics may include a usage history, from which a change may be derived, and may include a user level identifier, to designate content and channels available for a user level such as subscription, and may include geographic location of the receiving device, for switching to locally relevant content. The involuntary switching may occur in response to a counter, such as a counter that counts elapsed time or sequences of frames. When the counter value reaches a predetermined value, the channel from which the streaming buffer produces output is automatically changed to a different channel. The Epoch Manager will typically enforce such automatic switching. Other components of the system may choose to enforce an involuntary channel change. For example, a network monitor component may detect sever changes in network condition, and may choose to show a bulletin with that information. The network monitor component can then provide a command that is received at the streaming buffer and that enforces a channel change.

Additional network conditions can produce an involuntary channel change from the streaming buffer. For example, the system can detect when the geographic location of the receiving device changes, such as where the receiving device is a Web-enabled cell phone or video viewing device, and the system can then force a change in channel by issuing a command received at the streaming buffer. It should be understood that a user may select a different channel, in which case a voluntary channel change is enforced by the epoch manager at the streaming buffer. Another use of epoch queue switching is insertion of advertising into the streamed content (referred to herein as ad insertion). That is, a broadcast channel being viewed at a receiving device might remain the same, but new content (such as ad insertion) may occur with no other change apparent at the receiving device. Common triggers used in the broadcast industry for ad insertion include a DTMF tone embedded in the audio track, a specific signal embedded in the vertical blanking interval (VBI) of the broadcast video, or SMPTE LTC. Each of these techniques will be known to those skilled in the art. Upon receiving the trigger, the Streaming Server can switch one or more receivers to a different queue that contains advertising content that has been prepped and encoded using the methods described herein. The receiving device thereby displays the streamed content as indicated by the selected channel at the receiving device, with the ad insertion occurring at the time of the switch to the different queue. Such switching occurs without action by the user at the receiving device.

Epoch Smoothing

It is common practice in video encoding to employ inter-frame encoding. If this technique is employed and if continuity is to be maintained from one epoch of prepped content to the next, the encoder must maintain some data from the previous epoch to effect a smooth transition to the next epoch. Similarly, it is very common in audio compression to employ overlapped windowing to ensure smooth transitions between coded segments (i.e., epochs). If epoch smoothing is not employed, discontinuity would result at the epoch transition boundary and would result in audible artifacts such as pops and cracks. Such situations may arise in connection with changing content, such as when inserting an advertising clip or changing content channels.

The configuration of the illustrated embodiment in FIGS. 1-12 is suited to epoch smoothing by the Content Creator 102. Epoch smoothing, as used herein, refers to operations by the Content Creator to ensure a smooth transition as the digital content is processed by the encoders and is delivered to the streaming buffer. This reduces the chance of a user at a receiving device experiencing choppy video or crackling audio. In the illustrated embodiment, both video and audio processing are performed in accordance with epoch smoothing as described herein.

Figure 13:
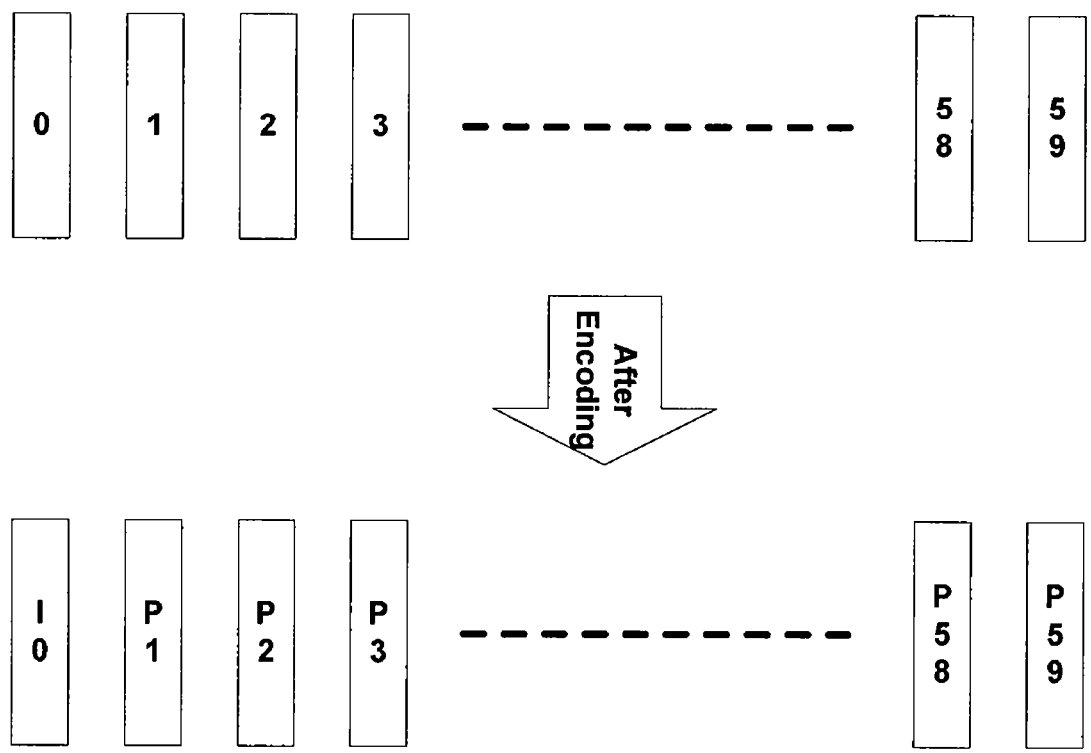
FIG. 13 is a schematic representation of encoder processing across epoch boundaries for video frames.

Encoding for network transmission of digital video files is typically performed in accordance with a compression algorithm that supports inter-frame coding. Such techniques are employed, for example, with specifications such as MPEG-4 SP and MPEG-1, where inter-frame coding is part of the core algorithm and where only I and P frames are used (that is, there are no B-frames or inter-slice framing). In the illustrated embodiments, when an encoder of the Content Creator 102 receives an epoch of video data, it is usually in the form of RGB or YUV information. The epoch will contain a certain number of frames, dependent upon epoch duration "DR" (see the discussion above related to Equation 1). For example, if the incoming video is received at a rate of 15 frames/sec and DR=4 seconds, there will be 60 frames within one epoch. This scenario is illustrated in the top sequence of frames in FIG. 13, which shows epoch frames 0 through 59. Upon receiving an epoch, the encoder generally encodes the very first frame in the sequence as an I-frame (which is intra-coded and has no dependency on any other frames in the epoch). All the other frames within the epoch are typically encoded either as I frames or P frames. FIG. 13 illustrates this scenario, where encoded frames of the epoch are indicated as starting with an I0 frame, corresponding to the encoded 0 frame of the source epoch, and continuing through the P59 frame, corresponding to the encoded 59 frame of the source epoch.

Figure 14:
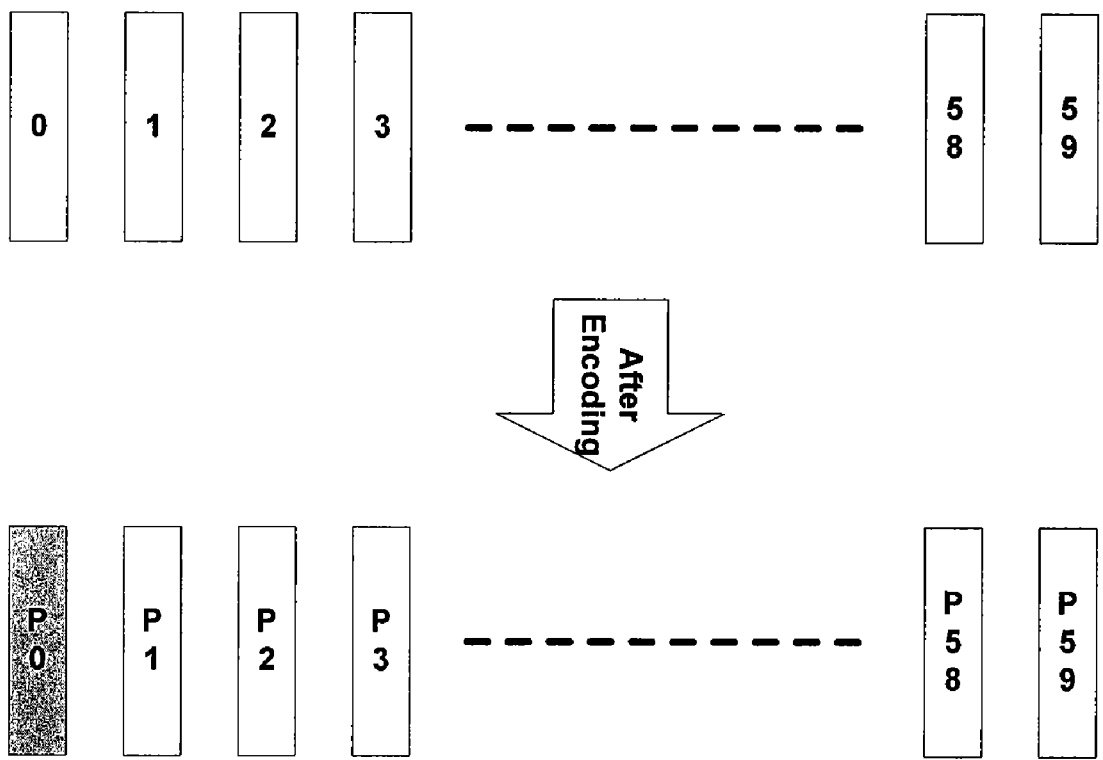
FIG. 14 is a schematic representation of encoder processing across epoch boundaries in accordance with epoch smoothing processing of the Content Creator that produces an epoch of all P-frames.

It is sometimes desirable to encode all the frames of an incoming epoch as P-frames. The resulting output is illustrated in FIG. 14 and can be provided by the illustrated embodiments. For example, an epoch of all P-frames would be more efficient because such a frame could take advantage of the compression efficiency of inter-frame coding. Typically, every new encoded epoch begins with an I-frame. This can affect video quality, due to the higher bit rate usage of an I-frame and its associated demands on network resources and bandwidth. In a conventional system, it is difficult to start an epoch with a P-frame, because no P-frame in the epoch can be produced without an I-frame first serving as the lead frame of the epoch, providing the base frame from which the P-frame can be encoded. In the illustrated embodiment, the encoder of the Content Creator enables smooth epoch transitions and supports P-frames as the first frame of an encoded epoch by producing an encoded I-frame copy of the last frame from the previous epoch, including it as the first frame in the subsequent epoch, and then encoding the subsequent epoch as P-frames. The encoder then deletes the now-superfluous leading encoded I-frame from the encoded frames of the subsequent epoch. In an MPEG-4 type of encoding where there is an explicit timestamp associated with each encoded frame, the time stamps will be updated by the encoder.

Figure 15:
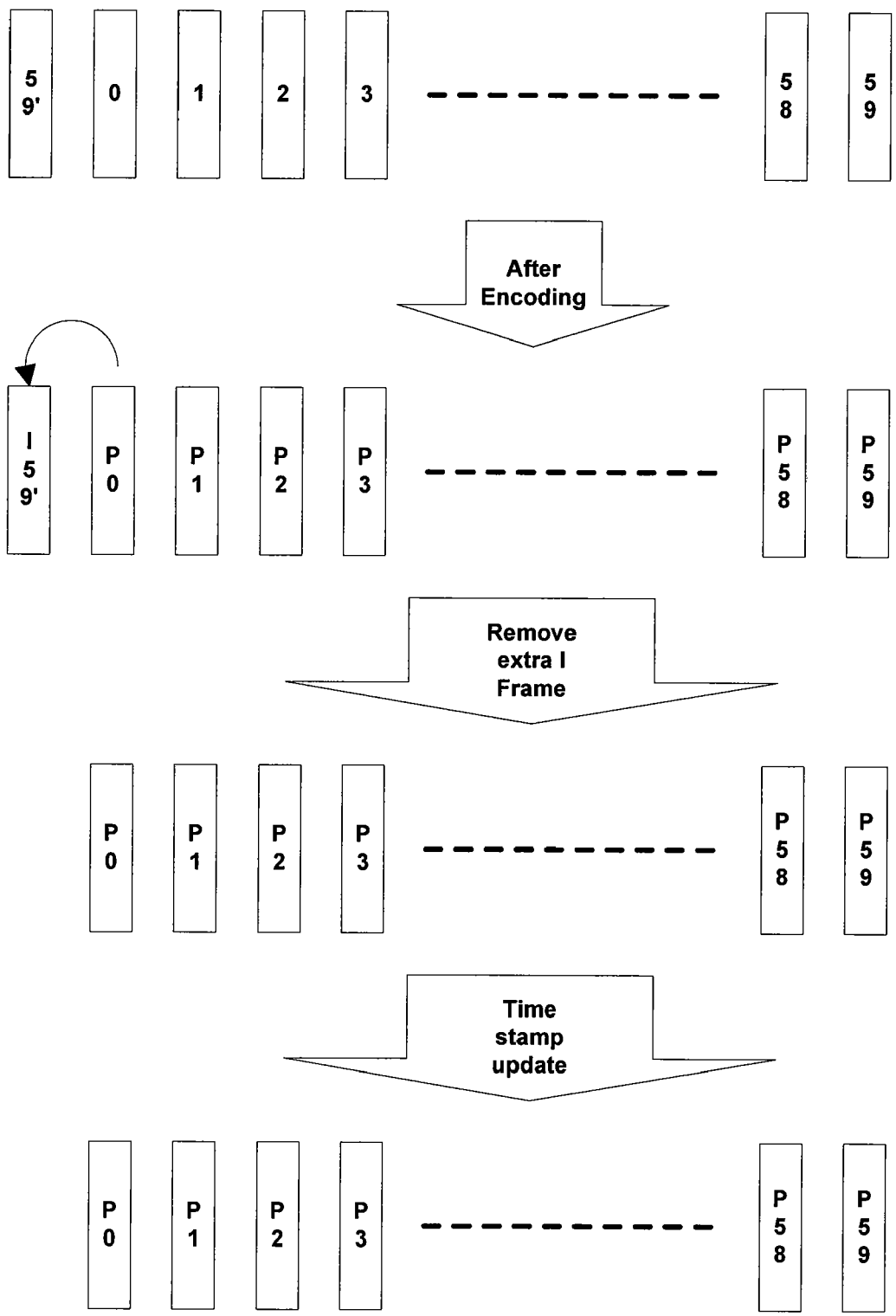
FIG. 15 is a schematic representation of the sequence of Content Creator encoder processing that produces the all P-frames output illustrated in FIG. 14 with smooth epoch transition.

FIG. 15 illustrates the process followed by the system. First, at the top sequence in FIG. 15, the frame indicated as 59' from the previous epoch is included as the first frame of the subsequent epoch as input to the encoder. The last preceding frame 59' is encoded as an I-frame, shown in I59' in the second sequence of FIG. 15, as the first frame of the subsequent epoch. The first frame of the subsequent epoch, frame 0, will be encoded as a P-frame, P0, as desired. The I59' frame is then removed from the prepped content of the subsequent epoch, and the encoded frames P0 through P59 are then re-timestamped by the encoder so as to be properly sequenced. This ensures a smooth transition from a preceding epoch to a subsequent epoch, and permits the subsequent epoch to begin with a P-frame.

The present invention also supports smooth epoch transitions for audio data. Most audio compression algorithms use FIR/IIR techniques and overlapped window transforms. When an encoder is presented with a finite segment of audio information, such as a new epoch, the encoder typically starts encoding the audio information with a "zero-state", meaning that all the history of its FIR/IIR/windows are set to zero. This can present a problem when two compressed epochs are played back-to-back. In a back-to-back playback situation, when the decoder starts decoding content from the subsequent (second) epoch, its filter states have already been initialized by the decoding of the first epoch, so it is no longer starting from a "zero" state. The decoder, however, will assume that the encoded data of the second epoch is beginning from a zero state, as is usual for a new epoch. This discrepancy between expected and actual creates a discontinuity in the audio information upon decoding, and the discontinuity will be manifested as transients and pops at the epoch boundary.

The illustrated embodiment resolves the difficulty in an approach that is very similar to the video epoch smoothing described above. Rather than attempt to adjust processing at the decoder, the processing of the encoder is implemented to ensure a smooth epoch transition. In the audio processing of the illustrated embodiment, a certain duration of audio from a preceding epoch is attached to the beginning of the subsequent epoch. The audio from the preceding epoch comprises a smooth segment that is attached to the content of the subsequent epoch for preparation by the encoder. The encoder therefore does not begin processing of the audio of the subsequent epoch in a "zero" state, ensuring a smooth transition upon playback.

Figure 16:
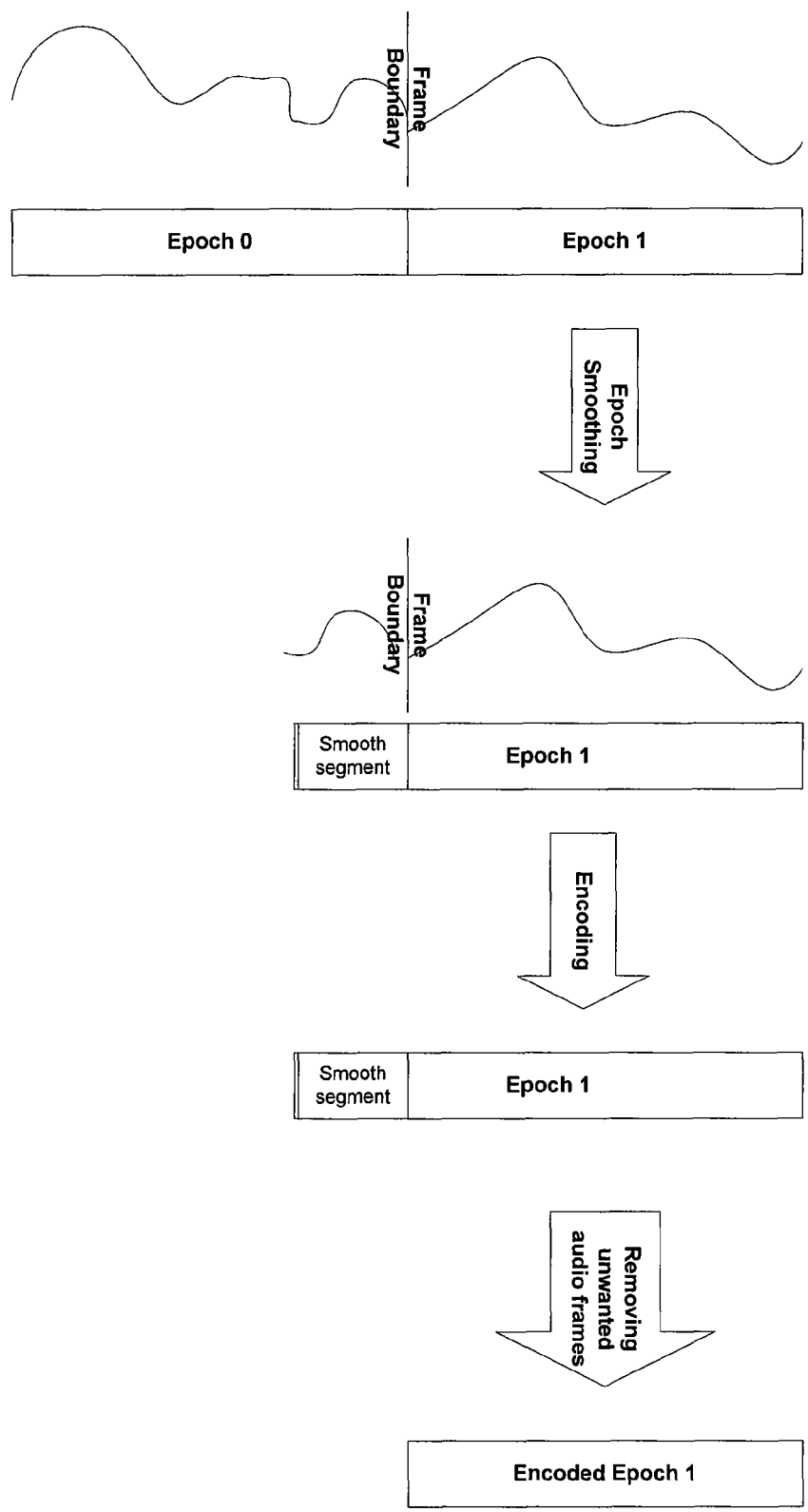
FIG. 16 is a schematic representation of the sequence of Content Creator encoder processing that produces encoded audio output with smooth epoch transition.

The epoch smoothing for audio encoding in accordance with the present invention is illustrated in FIG. 16. The top, first sequence in FIG. 16 shows a preceding Epoch 0 and a subsequent Epoch 1 with an audio representation graph indicating the audio information in the two epochs that will be processed by the encoders of the Content Creator. Epoch smoothing is then performed, indicated by the next (second) sequence in FIG. 16, which shows a smooth segment of audio information being processed by the Content Creator encoders along with the audio information from Epoch 1. The next sequence, the third sequence in FIG. 16, shows the encoded audio information as produced by the encoders constructed in accordance with the present invention. The encoded audio information includes the smooth segment, followed by the Epoch 1 information. The last sequence in FIG. 16 shows the removal of the encoded smooth segment from the Epoch 1 encoded audio information. The amount of audio information included with the smooth segment (i.e., its duration) will be selected in accordance with the amount of audio data needed to ensure that the encoders have processed sufficient data to not be in a "zero" state and to ensure a smooth audio transition by the decoded output upon playback.

One advantage of the epoch architecture described herein is the error concealment capability that is provided by the system configuration. For example, if the streaming encoder goes to an offline state while the streaming server is serving prepped content to the receiving devices, then so long as the data within the epoch queue has not been partially overwritten by the encoder at the time when the encoder goes offline, and assuming that the epoch queue has been set up as a cyclic buffer, then the streaming server can continue to serve prepped content to the receiving devices (albeit old content) without explicitly disconnecting all the receiving devices. When the encoder is ready to come back online, it simply synchronizes itself to the correct epoch and continues encoding prepped content in that epoch. Thus, if an encoder goes offline, the streaming server will repeat the current encoded contents of the buffer, in a loop, until the encoder comes back online and generates new encoded content.

A variety of features may be incorporated with encoding in accordance with the present invention. The encoding of a selected epoch interval can comprise encoding of a subset of data from a previous epoch. The encoding of a subset of data from a previous epoch can modify the operating state of the encoder. Further, the encoding of the selected epoch can commence with the modified state of the encoder. The encoded subset of data from a previous epoch can be removed from the prepped content of the selected epoch interval.

Those skilled in the art will understand that the length of the queue should be selected in consideration of system requirements and data storage resources. That is, the less tolerant the system performance will be for latency of streamed content, the shorter the queue should be, so that streaming begins more quickly after prepped content is first available. The more limited the system storage resources are, the shorter the queue should be, to hold less prepped content in the buffer. Thus, the queue length will be selected by balancing desired quality of service with available system resources, as will be known to those skilled in the art.

The devices described above, including the Streaming Encoder/Content Creator 102 and the Streaming Server/Content Customizer 106 and the Streaming Buffer 103 and the components providing the digital content 206 and prepped content 216, can be implemented in a wide variety of computing devices, so long as they can perform the functionality described herein. Such devices will typically operate under control of a computer central processor and will include user interface and input/output features. A display or monitor is typically included for communication of information relating to the device operation. Input and output functions are typically provided by a user keyboard or input panel and computer pointing devices, such as a computer mouse, as well as ports for device communications and data transfer connections. The ports may support connections such as USB or wireless communications. The data transfer connections may include printers, magnetic and optical disc drives (such as floppy, CD-ROM, and DVD-ROM), flash memory drives, USB connectors, 802.11-compliant connections, and the like. The data transfer connections can be useful for receiving program instructions on program product media such as floppy disks and optical disc drives, through which program instructions can be received and installed on the device to provide operation in accordance with the features described herein.

The present invention has been described above in terms of a presently preferred embodiment so that an understanding of the present invention can be conveyed. There are, however, many configurations for mobile enterprise data systems not specifically described herein but with which the present invention is applicable. The present invention should therefore not be seen as limited to the particular embodiments described herein, but rather, it should be understood that the present invention has wide applicability with respect to mobile enterprise data systems generally. All modifications, variations, or equivalent arrangements and implementations that are within the scope of the attached claims should therefore be considered within the scope of the invention.

We claim:

1. A method of processing digital content for streaming of live content network transport, the method comprising:
   encoding a digital content clip according to epoch intervals comprising one or more consecutive predetermined portions of the digital content clip, wherein the encoding generates prepped content that comprises at least one encoded representation of each epoch interval, such that each epoch interval comprises a different consecutive portion of the digital content clip;
   storing the prepped content for a predetermined number of epoch intervals into a streaming buffer of a network data store having a plurality of epoch queues each having a predetermined number of epoch locations for storing epoch intervals; selecting one of the prepped content epoch intervals for reading from the streaming buffer;
   providing an encoded representation of the selected prepped content epoch interval, in accordance with current network condition between the network data store and the receiving device, by network transport directed to the receiving device;
   wherein storing into the streaming buffer is performed by a writer for a first epoch interval and occurs substantially simultaneously with reading from the streaming buffer by a reader for a second epoch interval, and the storing of the first epoch interval and reading of the second epoch interval are performed according to a predetermined epoch interval separation distance between the first epoch interval and the second epoch interval.

2. The method as defined in claim 1, where the streaming buffer comprises a buffer having a single queue adapted to contain the encoded representations of the predetermined number of epoch intervals.

3. The method as defined in claim 1, where the streaming buffer comprises a buffer having multiple queues, with each said queue adapted to contain a single encoded representation of the predetermined number of epoch intervals.

4. The method as defined in claim 1, where the streaming buffer comprises a buffer having multiple queues, with each said queue adapted to contain multiple encoded representations of the predetermined number of epoch intervals.

5. The method as defined in claim 1, where the streaming buffer is a cyclic buffer.

6. The method as defined in claim 1, where the streaming buffer is an acyclic buffer.

7. The method as defined in claim 1, wherein the streaming buffer includes a recursive buffer.

8. The method as defined in claim 7, wherein the recursive buffer includes a cyclic streaming buffer.

9. The method as defined in claim 7, wherein the recursive buffer includes an acyclic streaming buffer.

10. The method as defined in claim 7, wherein the recursive buffer includes a recursive streaming buffer.

11. The method as defined in claim 1, wherein the streaming buffer contains a plurality of queue slots, each of which stores an epoch interval of prepped content, and wherein the store of at least one of the streaming buffer queue slots is replaced with an association to a recursive buffer that contains a plurality of lower level queue slots.

12. The method as defined in claim 11, wherein the lower level queue slots contain prepped content that is read from the recursive buffer when the corresponding prepped content epoch interval is selected from the streaming buffer.

13. The method as defined in claim 1, wherein streaming one of the prepped content epoch intervals comprises:
   detecting an encoding error condition;
   selecting alternate prepped content from a queue other than the queue from which selecting was being performed at the time of detecting the error condition.

14. The method as defined in claim 13, wherein selecting alternate prepped content comprises selecting from a recursive buffer that contains a plurality of lower level queue slots.

15. The method as defined in claim 14, wherein the lower level queue slots contain prepped content that is read from a recursive buffer when the corresponding prepped content epoch interval is selected from the streaming buffer.

16. The method as defined in claim 1, wherein the epoch interval is selected in accordance to the temporal resolution of a counter.

17. The method as defined in claim 16, wherein the counter is a UTC (Coordinated Universal Time) counter.

18. The method as defined in claim 16, wherein the counter is an SMPTE (Society of Motion Picture and Television Engineers) LTC (Linear Time Code) counter.

19. The method as defined in claim 1, wherein the epoch interval is selected to minimize latency in media delivery.

20. The method as defined in claim 19, wherein the latency is measured in the time elapsed between media content appearing at the input of the encoder, and the streamed encoded representation appearing at the receiving device.

21. The method as defined in claim 1, wherein storing into the streaming buffer and retrieving from the streaming buffer are performed according to selecting an epoch based on a common counter, epoch interval, and an epoch offset.

22. The method as defined in claim 21, wherein the value of the common counter is distributed via NTP (Network Time Protocol).

23. The method as defined in claim 21, wherein the value of the common counter is distributed via audio signal carr in SMPTE (Society of Motion Picture and Television Engineers) LTC (Linear Time Code).

24. The method as defined in claim 21, wherein the epoch offset of the reader is determined in accordance with a level of service parameter.

25. The method as defined in claim 24, wherein the level of service parameter relates to a user level identifier.

26. The method as defined in claim 21, wherein the epoch offset of the reader is selected to guarantee exclusive access of epoch chosen by the writer.

27. The method as defined in claim 24, wherein the level of service parameter relates to latency in media delivery.

28. The method as defined in claim 21, wherein storing into the streaming buffer by writers is further controlled by write enable signal.

29. The method as defined in claim 1, wherein streaming an encoded representation is performed in accordance with at least two parameters selected from among current network condition, receiving device configuration, and prepped content type.

30. The method as defined in claim 1, wherein streaming comprises selecting a plurality of prepped content epoch intervals such that each selected prepped content epoch interval is transported to a different one of a plurality of receiving devices.

31. The method as defined in claim 1, further comprising:
switching from the selected prepped content epoch interval corresponding to the original streaming buffer to a different prepped content epoch interval corresponding to a different streaming buffer such that the different prepped content epoch interval is selected for streaming by network transport directed to the receiving device with no change to the selected prepped content epoch interval of the streaming buffer.

32. The method as defined in claim 31, wherein switching is initiated in response to a user command at the receiving device.

33. The method as defined in claim 31, wherein switching is initiated in response to a counter.

34. The method as defined in claim 33, wherein the counter is a UTC (Coordinated Universal Time) counter.

35. The method as defined in claim 33, wherein the counter is an SMPTE (Society of Motion Picture and Television Engineers) LTC (Linear Time Code) counter.

36. The method as defined in claim 31, wherein switching is initiated in response to a command received at the streaming server buffer.

37. The method as defined in claim 31, wherein switching is initiated in response to a characteristic of the receiving device.

38. The method as defined in claim 37, wherein the characteristic comprises usage history of the receiving device.

39. The method as defined in claim 37, wherein the characteristic comprises a user level identifier.

40. The method as defined in claim 37, wherein the characteristics comprises the geographical location of the receiving device.

41. The method as defined in claim 31, wherein switching is initiated in response to a cue in the prepped content.

42. The method as defined in claim 41, wherein the cue is a DTMF tone in an audio portion of the prepped content.

43. The method as defined in claim 41, wherein the cue is a signal in a vertical blanking interval in a video portion of the prepped content.

44. The method as defined in claim 31, wherein the different streaming buffer comprises an encoded different digital content clip source different from that of the original streaming buffer.

45. The method as defined in claim 31, wherein latency in switching is determined by the epoch interval.

46. The method as defined in claim 1, wherein the encoding of a chosen epoch interval comprises encoding of a subset of data from previous epoch.

47. The method as defined in claim 46, wherein the encoding of a subset of data from a previous epoch modifies operating state of the encoder.

48. The method as defined in claim 47, wherein the encoding of the selected epoch commences with the modified state of the encoder.

49. The method as defined in claim 46, wherein the encoded subset of data from a previous epoch is removed from the prepped content of the selected epoch interval.

50. A system for processing digital content for streaming of live content network transport, the system comprising:
a network communications interface; a streaming encoder that encodes a digital content clip according to epoch intervals comprising one or more consecutive predetermined portions of the digital content clip, wherein the streaming encoder generates prepped content that comprises multiple encoded representations of each epoch interval, such that each epoch interval comprises a different consecutive portion of the digital content clip and each of the multiple encoded representations comprises a different encoded representation of the corresponding digital content clip epoch interval;
a streaming buffer comprising a network data store that receives the prepped content from the streaming encoder for a predetermined number of epoch intervals;
a streaming server that selects one of the prepped content epoch intervals for reading from the streaming buffer in accordance with current network condition between the network data store and the receiving device for streaming the selected prepped content epoch interval by network transport directed to the receiving device;
wherein storing into the streaming buffer occurs substantially simultaneously with reading from the streaming buffer, and the streaming and reading are performed according to a predetermined epoch interval separation distance.

51. The system as defined in claim 50, where the streaming buffer comprises a buffer having multiple queues adapted to contain the multiple encoded representations of the predetermined number of epoch intervals.

52. The system as defined in claim 51, where the streaming buffer is a cyclic buffer.

53. The system as defined in claim 51, where the streaming buffer is a linear buffer.

54. The system as defined in claim 51, wherein the streaming buffer includes a recursive buffer.

55. The system as defined in claim 50, wherein the epoch interval separation distance is determined in accordance with a level of service parameter.

56. The system as defined in claim 55, wherein the level of service parameter relates to network latency.

57. The system as defined in claim 55, wherein the level of service parameter relates to a user level identifier.

58. The system as defined in claim 50, wherein the streaming server selects in accordance with at least two parameters selected from among current network condition, receiving device configuration, and prepped content type.

59. The system as defined in claim 50, wherein the streaming server selects a plurality of prepped content epoch intervals such that each selected prepped content epoch interval is transported to a different one of a plurality of receiving devices.

60. The system as defined in claim 50, wherein the streaming server further switches from the selected prepped content epoch interval to a different prepped content epoch interval corresponding to an encoded different digital content clip such that the different prepped content epoch interval is selected for streaming by network transport directed to the receiving device with no change to the selected prepped content epoch interval of the streaming buffer.

61. The system as defined in claim 60, wherein the different prepped content epoch interval is read from the streaming buffer.

62. The system as defined in claim 60, wherein the different prepped content epoch interval comprises a live content clip that is read from an external prepped content buffer.

63. The system as defined in claim 60, further comprising: switching
from the different prepped content epoch interval back to the selected prepped content epoch interval for streaming by network transport directed to the receiving device.

64. The system as defined in claim 60, wherein the encoded different digital content clip is received from a source different from that of the digital content clip.

65. A program product for use in a computer system that executes program instructions recorded in a computer-readable media to perform a method for processing digital content for streaming of live content network transport, the program product comprising;
a recordable media;
a program of computer-readable instructions executable by the computer system to perform operations comprising:
encoding a digital content clip according to epoch intervals comprising one or more consecutive predetermined portions of the digital content clip, wherein the encoding generates prepped content that comprises multiple encoded representations of each epoch interval, such that each epoch interval comprises a different consecutive portion of the digital content clip and each of the multiple encoded representations comprises a different encoded representation of the corresponding digital content clip epoch interval;
storing the prepped content for a predetermined number of epoch intervals into a streaming buffer of a network data store;
selecting one of the prepped content epoch intervals for reading from the streaming buffer in accordance with current network condition between the network data store and the receiving device for streaming the selected prepped content epoch interval by network transport directed to the receiving device;
wherein storing into the streaming buffer occurs substantially simultaneously with reading from the streaming buffer, and the streaming and reading are performed according to a predetermined epoch interval separation distance.

66. The program product as defined in claim 65, wherein the streaming buffer comprises a buffer having multiple queues adapted to contain the multiple encoded representations of the predetermined number of epoch intervals.

67. The program product as defined in claim 66, where the streaming buffer is a cyclic buffer.

68. The program product as defined in claim 66, where the streaming buffer is a linear buffer.

69. The program product as defined in claim 66, wherein the streaming buffer includes a recursive buffer.

70. The program product as defined in claim 65, wherein the epoch interval separation distance is determined in accordance with a level of service parameter.

71. The program product as defined in claim 70, wherein the level of service parameter relates to network latency.

72. The program product as defined in claim 70, wherein the level of service parameter relates to a user level identifier.

73. The program product as defined in claim 65, wherein selecting is performed in accordance with at least two parameters selected from among current network condition, receiving device configuration, and prepped content type.

74. The program product as defined in claim 65, wherein selecting comprises selecting a plurality of prepped content epoch intervals such that each selected prepped content epoch interval is transported to a different one of a plurality of receiving devices.

75. The program product as defined in claim 65, further comprising:
switching from the selected prepped content epoch interval to a different prepped content epoch interval corresponding to an encoded different digital content clip such that the different prepped content epoch interval is selected for streaming by network transport directed to the receiving device with no change to the selected prepped content epoch interval of the streaming buffer.

76. The program product as defined in claim 75, wherein the different prepped content epoch interval is read from the streaming buffer.

77. The program product as defined in claim 75, wherein the different prepped content epoch interval comprises a live content clip that is read from an external prepped content buffer.

78. The program product as defined in claim 75, further comprising:
switching from the different prepped content epoch interval back to the selected prepped content epoch interval for streaming by network transport directed to the receiving device.

79. The program product as defined in claim 75, wherein the encoded different digital content clip is received from a source different from that of the digital content clip.

* * * * *